United States Patent [19]

Fujio

[11] Patent Number: 5,131,522

[45] Date of Patent: Jul. 21, 1992

[54] TRANSFER APPARATUS

[75] Inventor: Yoshihiko Fujio, Komaki, Japan

[73] Assignee: Daifuku Co., Ltd., Japan

[21] Appl. No.: 675,536

[22] Filed: Mar. 25, 1991

[30] Foreign Application Priority Data

| Mar. 29, 1990 | [JP] | Japan | 2-83281 |
| Mar. 29, 1990 | [JP] | Japan | 2-83283 |
| Mar. 29, 1990 | [JP] | Japan | 2-83284 |
| Oct. 2, 1990 | [JP] | Japan | 2-264748 |
| Oct. 3, 1990 | [JP] | Japan | 2-267095 |
| Oct. 3, 1990 | [JP] | Japan | 2-267096 |
| Oct. 8, 1990 | [JP] | Japan | 2-270151 |

[51] Int. Cl.⁵ ............................................. B65G 47/46
[52] U.S. Cl. ..................................... 198/370; 198/372
[58] Field of Search ........................ 198/365, 370, 372

[56] References Cited

U.S. PATENT DOCUMENTS

| 3,361,247 | 1/1968 | Lauzon . | |
| 3,987,888 | 10/1976 | Wickam | 198/365 X |
| 4,884,677 | 12/1989 | Yu et al. | 198/370 |
| 4,971,190 | 11/1990 | Berends et al. | 198/370 |
| 5,027,939 | 7/1991 | Kilper et al. | 198/365 |

Primary Examiner—D. Glenn Dayoan
Attorney, Agent, or Firm—Barnes, Kisselle, Raisch, Choate, Whittemore & Hulbert

[57] ABSTRACT

Transfer apparatus of the type in which transverse article advancing rollers are moved by a conveyor along a predetermined path. The apparatus also includes crossing track sections for diverting articles on the conveyor to branch conveyors, with a control switch for the crossing track sections.

7 Claims, 20 Drawing Sheets

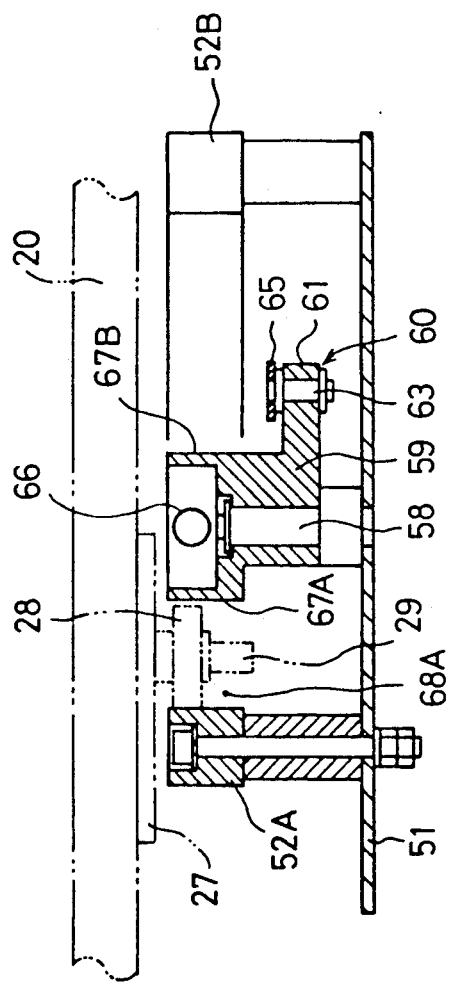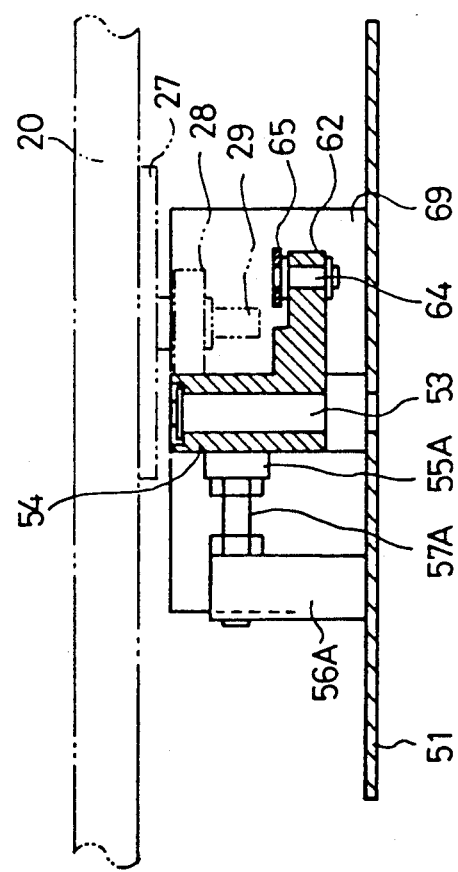

TRANSFER APPARATUS

FIELD OF THE INVENTION

The present invention relates to a transfer apparatus for moving laterally of a main transport route articles transported thereon or for transferring the same onto a branch transport route provided laterally outwardly of the main transport route.

Conventional apparatus of as this kind of apparatus, a widthwise moving conveyer is provided which is disclosed in, for example, the Japanese Patent Laid-Open Gazette No. Sho 64-38312 or No. Hei 1-139420.

The apparatus disclosed in the Japanese Patent Laid-Open Gazette No. Sho 64-38312 is so constructed that a large number of guide bars are disposed between a pair of right- and left-side rails through rollers, front and rear guide bars are connected therebetween by use of chains, a slider guided by the guide bars to be laterally movable is provided, a rotary element is provided at the rear surface of the slider, and a group of guide rails for guiding the rotary element are provided. At the branch formed by the guide rail group are provided a turning guide member laterally swingable through a pin and a hydraulic cylinder in association with the turning guide member, and such slider guide devices are provided at both sides of a forward route and a backward route.

Such conventional type apparatus can transport articles by a guide bar group integrally movable by driving the chain, at which time the slider guide apparatus guides and moves the slider widthwise of the conveyer, whereby the articles are pushed sidewise by the slider group to be moved toward one widthwise side. The sliders are changed over in the moving direction by laterally swinging the turning guide member around the pin through operation of a hydraulic cylinder, the turning member having a roller formed in a channel shape capable of being fitted in order to laterally separate the sliders into two.

In the conventional apparatus of the above-mentioned type, rollers sequentially pass in short pitches at the turning guide member. Accordingly, when the changeover swinging motion of the turning member is not performed at a good timing (with accuracy), the roller may collide with the upper end surface of the turning member or the roller coming out therefrom collide with the upper end surface of guide rail, resulting in these members being broken down. Incidentally, in order to adjust the timing, the speed of the guide bar need only be reduced, which leads to deterioration in efficiency of an expected widthwise moving work.

The apparatus disclosed in the Japanese Patent Laid-Open Gazette No. Hei 1-139420 (to be hereinafter called the second type) is so constructed that a frame has a pair of lateral side rails. A chain rail of U-like shape in section is provided inside the side rails, and a pair of chains to be fitted into the chain rail and supportingly guided are laterally provided. Between the chain are disposed a number of tubular members through L-like-shaped brackets, and engaging pads guided by the tubular members and laterally movable are provided, a group of guide rails of a guide device are provided at the rear surface of engaging pads, a switch is provided at each branch formed by the guide rail group, and rails for receiving the transferred articles are provided laterally outwardly. Since the second conventional type apparatus fixes the chain rails to the side rails by welding or the like, its positioning accuracy is not easily obtained and the fixing work becomes troublesome.

Also, the side rails cover the entire side surface of conveyer, whereby maintenance and inspection to the backward route (the interior) is not easy and further the arrangement of internal components are not easy, thereby not facilitating arrangement of coupling members provided between both side rails.

Furthermore, in the above-mentioned conventional type apparatus, the tubular members are positioned considerably more internally than the longitudinal plate at the side rail and rails are laid outside the longitudinal plates, thereby forming a large gap between the tubular member and the rail. Accordingly, the article, when small-sized or elongate, may fall into the gap, making it impossible to smoothly and accurately perform the transfer of articles.

Furthermore, in the above-mentioned second conventional type apparatus, when the engaging pad group laterally push the article, the laterally pushing force is transmitted to the tubular members therethrough so as to move the tubular members in the same direction. Hence, the chains also move to abut at the external ends thereof against the outer side plate and the chains are driven in this state, thereby generating noises by slidable contact.

Furthermore, in the above-mentioned second conventional type apparatus, for example, when the engaging pad is removed for assembly or exchange, as shown by the phantom line in FIG. 22, the chain 19, after lifted from the chain rail 43, must be outwardly moved as shown in FIG. 23 in order to remove the bracket 84, at which time the chain 19 disengages from the tubular member 49A adjacent to the objective that 49, thereby not facilitating later quick assembly.

Furthermore, in the above-mentioned second conventional type apparatus, dust is liable to accumulate in the chain rail and not easy to clean and also the chain cannot be moved smoothly due to dust. Furthermore, a dangerous state of catching a worker's suit or the like by the chain is liable to occur.

Furthermore, in the above-mentioned second conventional type apparatus, the engaging pads are disposed on a body supported and guided by the tubular member 49 and having the guide device through a top plate and an intermediate plate, and fixed at the body through a bolt-like tightening member.

In the above-mentioned conventional type apparatus, the bolt-like tightening member is subjected to a widthwise pushing reaction force or an impact force acting on the engaging pads so that the fixed pads become loose, whereby in some cases the pads may disengage from the body.

SUMMARY OF THE INVENTION

A first object of the invention is to provide a transfer apparatus which can smoothly change over guide members even when a conveyer is operated at high speed.

A second object of the invention is to provide a frame structure of a transfer apparatus which is easy to mount and horizontally and vertically connect the guide rails and moreover to perform the internal maintenance and inspection.

A third object of the invention is to provide a transfer apparatus which sufficiently diminishes a gap between the tubular member and the rail so as to always accurately and smoothly transfer even small-sized or elongate articles from a main transport route to a branch transport route.

A fourth object of the invention is to provide a transfer apparatus which prevents the tip of a link pin of the chain from abutting against the side cover part so as to avoid generation of noises caused if the tip abuts against the side cover part.

A fifth object of the invention is to provide a transfer apparatus which, when any one of the rollers must be removed from the chain, can remove therefrom the one roller only.

A sixth object of the invention is to provide a transfer apparatus which can prevent dust from transferring to an endless rotary member and also facilitate maintenance and inspection of the endless rotary member and operate safely.

A seventh object of the invention is to provide a transfer apparatus in which a portion in contact with the article at the respective movable members laterally pushing the articles on the main transportation route is formed of a rubber member of buffer action and the rubber member can rigidly be fixed.

In order to attain the first object, the transfer apparatus of the present invention has a pair of right- and left-side endless rotary members disposed along the main transport route, a number of guide bars mounted between the endless rotary members through free ends and extending perpendicularly to the main transport route, movable members guided by the guide bars, a guided part provided at the rear surface of each movable member, a group of guide members for guiding the guided part, and a changeover device disposed at a branch of the guide member group. The changeover device comprises a pair of right- and left-side swinging members mounted thereto through first support shafts, retained portions formed on the opposite surfaces of both the swinging members above the first support shafts, an operating member mounted laterally swingably to the same through a second support shaft positioned above both the first support shaft, a pair of retaining members provided at the operating member and opposite to both the retained portions, and an operating device in association with the operating members.

In such construction of the present invention, the group of guide bars is moved through the endless rotary members so that articles supplied to the initial end of the main transport route can be transported toward the termination, at which time the movable members integrally movable with the guide bars are guided by the guide member group to move widthwise thereby laterally pushing the articles by the movable members. The movable members moving on the backward route are guided leftwardly or rightwardly by operating the lower changeover device, thereby positioning the initial end on the forward route. In other words, the movable members having moved on the backward route reach part of lower changeover device, at which time when the swinging members are swinging in the predetermined direction, for example, one-sidedly, the guided members pass between both the swinging members to be guided one-sidedly. At this time, the foremost ends of edge members in continuation of the group of guide members can be protected by other swinging members swingably approaching. When an instruction of changeover to the other side corresponding to the article to be transported is given, the operating device moves the operating member in swinging motion. At an intermediate position of the swinging motion, the other retaining member does not yet engage with the retained portion, whereby the other swinging member maintains its closing posture and one retaining member leaves the retained portion to thereby move the one swinging member in swinging motion so as to be close to the edge member. In other words, at the intermediate position of swinging motion, both the swinging members protect the edge members, at which time the guided portions sequentially moving at short pitches are just before abutting against both the swinging members and then are to abut thereagainst. At this time, the operation of operating device and swinging motion of operating member continue to the other side, so that the operating member can simply escape from the dead point (the nutral position) by means of contact pressure and the other swinging member leads to swinging motion to the other side. Hence, the guided members pass between both the swinging members to be guided to the other side, at which time the edge member can be protected at its tip by one swinging member. When both the swinging members of the lower changeover device either completely changeover-swings or are positioned at the intermediate portion in the changeover swinging motion, the foremost ends of edge members in continuation of the guide member group are always protectable by at least one of both the swinging members. Moreover, when the guided members abut against the swinging members at the neutral position, the swing member in the changeover direction smoothly is open, so that even for the high speed and efficient branch working, the changeover is performable smoothly and reasonably.

In order to attain the second object, a body frame used in the transfer apparatus of the present invention has at both sides pairs of upper and lower frame members respectively, which are extrusion molds of aluminum and form at the interior and the exterior pairs of upward dovetails and downward dovetails respectively.

In the body frame of such construction, the guide rails for the endless rotary members at the forward and backward routes are mountable by being fitted into the upward dovetail grooves inside the upper and lower frame members lengthwise of the groove. The downward dovetail groove outside the upper frame materials and the upward dovetail groove outside the lower frame member are utilized to connect both the frame members in the direction of the main transport route through a plurality of connecting members, at which time internal maintenance and inspection and various works are performable through space between the longitudinal connection members. Furthermore, the same can be connected widthwise simply by merely fitting the connecting member into the inside downward dovetail grooves.

In order to attain the third object, the upper frame members at both sides of body frame are extrusion-molded in an L-like shape, at the upper end of the longitudinal material part positioned inside of the frame are formed mounting parts for the guide rail supporting the endless rotary member, and a branch conveyer is positioned at the initial end thereof close to the outside of longitudinal member. Accordingly, the gap between the longitudinal member and the branch conveyer becomes so small that even a small-sized or an elongate article does not fall into the gap.

In order to attain the fourth object of the present invention, the guide rails each have at the outer end thereof a side cover part positioned outside the endless rotary member and at the inner end a horizontal guide against which the free end of the guide bar desirably abuts before the endless rotary member abuts against the side cover part.

In the guide rails of such construction, when the movable member pushes the article widthwise, the guide bar and endless rotary member move in the same direction, but the movement is regulated by abutting of the free end of the guide bar against the lateral guide part and can be prevented by abutting the endless rotary member against the side cover part. Therefore, it is possible to prevent generation of noises caused by slide contact of the side surface of endless rotary member.

In order to attain the fifth object, the guide rails each have an upward guide surface for supporting and guiding the chain and a side cover part positioned outside the chain. The rollers each have an end cap at the free end, at the central portion of the end cap is formed a fitting bore to which the link pin of chain is desirably detachably fitted, and at the outer end of end cap and a position circumferentially thereof is formed a slit part communicating with the outer end of the fitting bore and allowing the link pin to move vertically.

It is apparent that such construction greatly facilitates removal of one roller from the chain. In detail, for example, when a specified roller is repaired, at first, the objective roller is rotated with respect to the link pin to position the slit part just above, one or a plurality of rollers positioned in the front and rear of the objective roller are rotated with respect to the link pin to turn the slit part laterally or downwardly. In this state, the chain is lifted and part thereof opposite to the objective roller is moved outwardly, whereby the link pin is pulled out from the fitting bore, but before it is completely pulled out, the inner end of the link pin is opposite to the slit part, regulating in that the objective roller disengages in a falling manner. The adjacent roller, however, is not disengaged, because a non-slit part is opposite from above to the inner end of link pin. Hence, the objective roller only is removed or assembled in the reverse procedure.

In order to attain the sixth object, at the upper portions of both sides of the body frame are formed retaining grooves having elastic holding portions formed at the upper ends, a desirably disposed cover body is provided above the endless rotary member, and at the outside end of the cover body is formed a retained part detachably mounted to the elastic groove against the elasticity of elastic holding portion.

In such construction, the cover body engages at the retained portion thereof with the retaining groove so as to be positioned above the endless rotary member and supported to the body frame side, thereby receiving dust so as to prevent it from moving toward the endless rotary member and to prevent a worker's clothing or the like from being caught by the frame. Also, the cover body can be dismounted from the retaining groove by removing the retained portion from the retaining groove against the elasticity of the elastic holding portion, thereby enabling the endless rotary member or the like to perform maintenance and inspection thereof with ease.

These and other objects of the invention will be seen by reference to the description, taken in connection with the accompanying drawing, in which:

BRIEF DESCRIPTION OF THE DRAWINGS

FIG. 13 is a sectional view taken on the line XIII—XIII in FIG. 12, FIG. 14 is a sectional view taken on the line XIV—XIV in FIG. 12.

DESCRIPTION OF THE PREFERRED EMBODIMENTS

Figure 1:
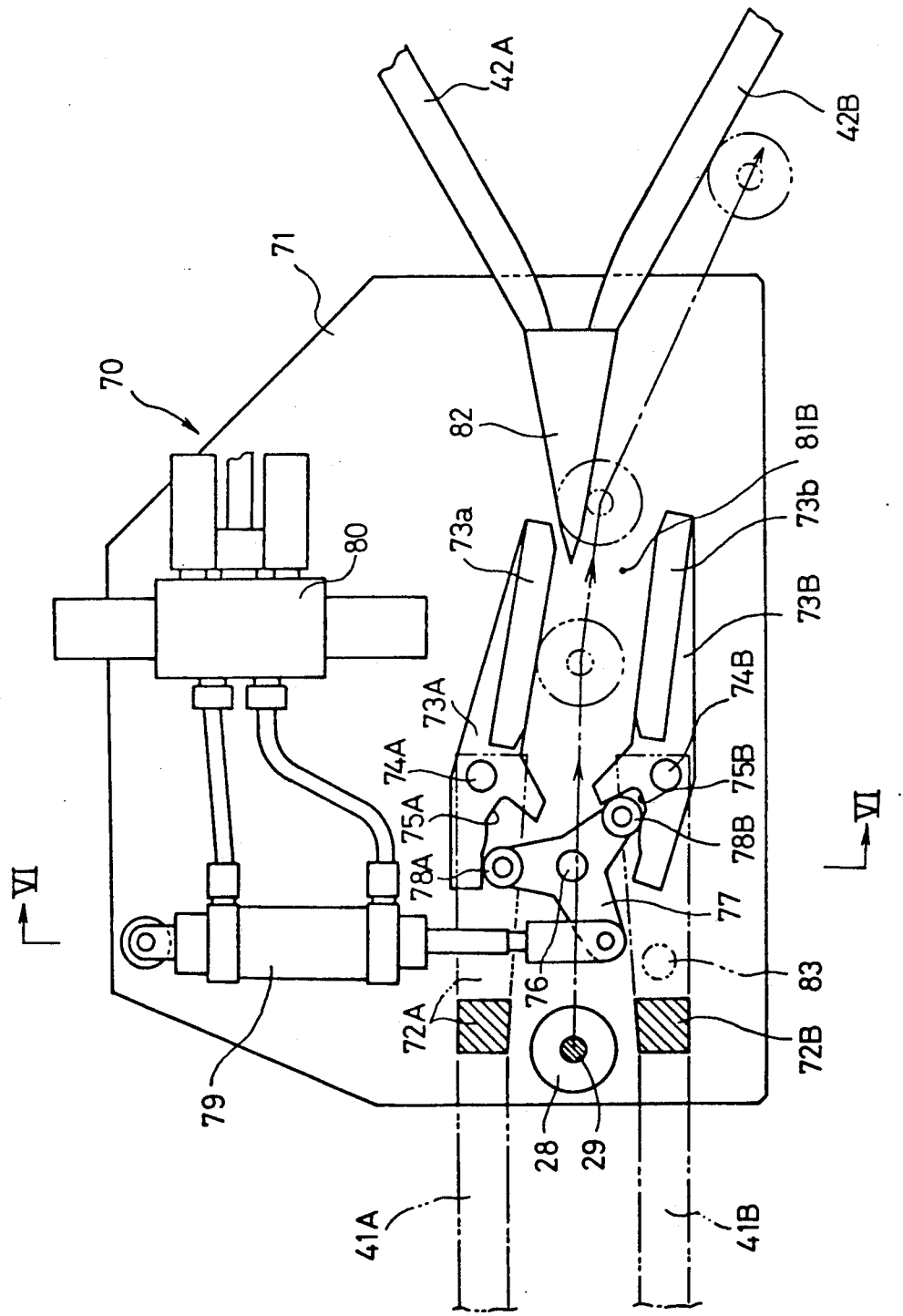
FIG. 1 is a bottom view of a lower changeover device.

An embodiment of a transfer apparatus of the present invention will be described by reference to the accompanying drawings.

In FIGS. 5, 6, 8 and 17, reference numeral 1 designates a body frame, which is installed on a floor through a grounding member 37. The body frame 1 comprises pairs of upper and lower frame members 2 and 3 disposed at both sides of the body frame 1 respectively, a vertical connecting member 4 for connecting the respective upper and lower frame members, a horizontal connecting member 5 for connecting the respective right- and left-side frame members, and legs 6 extending downwardly from the lower frame members 3. The frame members 2 and 3 each are extrusion-molded of aluminum into an L-like shape by vertical member parts 2a and 3a and horizontal member parts 2b and 3b, the vertical member parts 2a and 3a being internally disposed and cutout-like stepped member 2c and 3c being disposed to be open at the outside. Furthermore, at the frame members 2 and 3 are formed an inside upward dovetail groove 7a at the upper ends of the vertical member parts 2a and 3a, an inside downward dovetail groove 7b and an outside downward dovetail groove 7c at the horizontal members 2b and 3b and outside upward dovetail grooves 7d at the stepped portions 2c and 3c of the horizontal members 2b and 3b, these dovetail groove 7a through 7d being formed entirely lengthwise of the frame when extrusion-molded. The vertical connecting member 4 is integral with the upper frame member 2 in such a manner that a plate-like nut 8 is positioned in the outside downward dovetail groove and a bolt 9 is inserted from below into a bore at the upper end of the vertical connecting member 4 and then threadedly engages with the nut 8. The outside upward dovetail groove 7d at the lower frame member 3 is utilized and a nut 8 and a bolt 9 are used so that the vertical connecting member 4 is integral with the lower frame member 3. A plurality of vertical connecting members 4 are disposed at predetermined intervals lengthwise of the frame members 2 and 3, thereby forming spaces between the respective vertical connecting members 4. A plurality of horizontal connecting members 5 are provided between the upper frame members 2 and between the lower frame members 3 by utilizing the inside downward dovetail grooves 7b and by use of nuts 8 and bolts 9 respectively. The legs 6 are connected to the lower frame members 3 by utilizing the outside downward dovetail grooves 7c and by use of nuts 8 and bolts 9 respectively. At the inside upward dovetail groove 7a of the upper frame member 2 is mounted a forward route side guide tail 22 of, for example, resin mold, by being inserted into the groove 7a lengthwise thereof. Also, a backward route side guide rail 23 is similarly mounted into the inside upward dovetail groove 7a at the lower frame member 3, these guide rails 22 and 23 being fixed by screws or the like to the frame members 2 and 3 after being inserted into the dovetail grooves 7a respectively. The inside upward dovetail grooves 7a form the mounting portions for the guide rails 22 and 23 respectively.

Both the guide rails 22 and 23 are so constructed that the upper surfaces thereof form supporting guide surfaces 22a and 23a for endless rotary members (to be discussed below), side cover portions 22b and 23b are integrally erected from the outer ends of the supporting guide surfaces 22a and 23a, horizontal guide portions 22c and 23c projecting inwardly from the inside vertical portions 2a and 3a are provided at the inner ends of the guide surfaces 22a and 23a, and fitting portions 22d and 23d for fitting into the inside upward dovetail grooves 7a are provided at the lower portions of guide rails 22 and 23.

Figure 5:
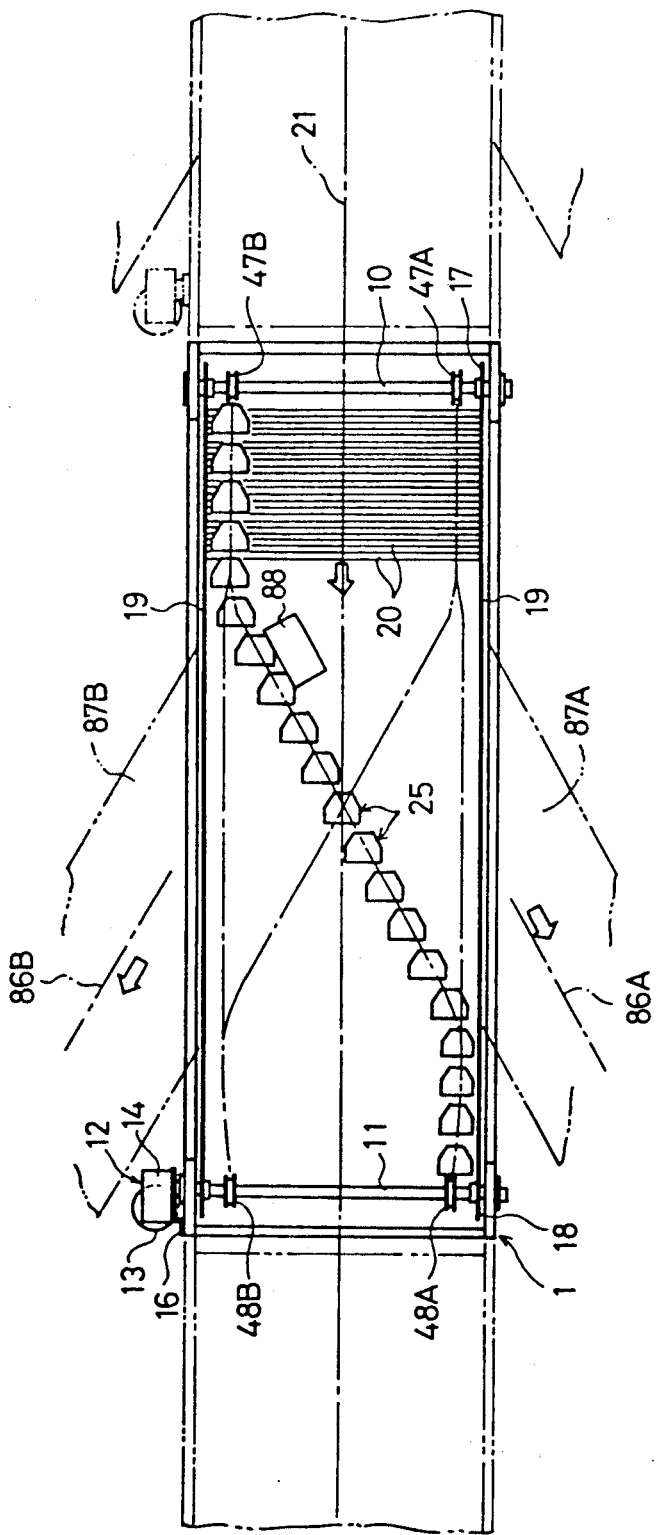
FIG. 5 is a schematic plan view of the entire transfer apparatus.
Figure 6:
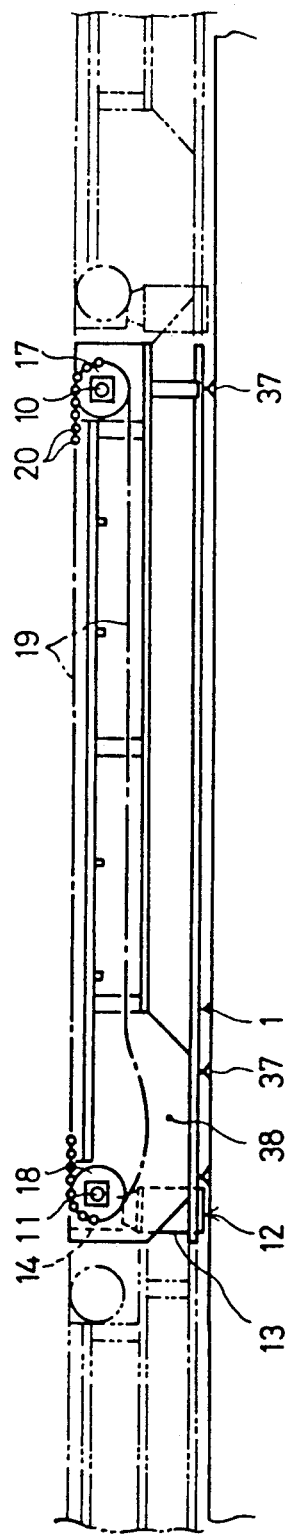
FIG. 6 is a schematic side view thereof.
Figure 7:
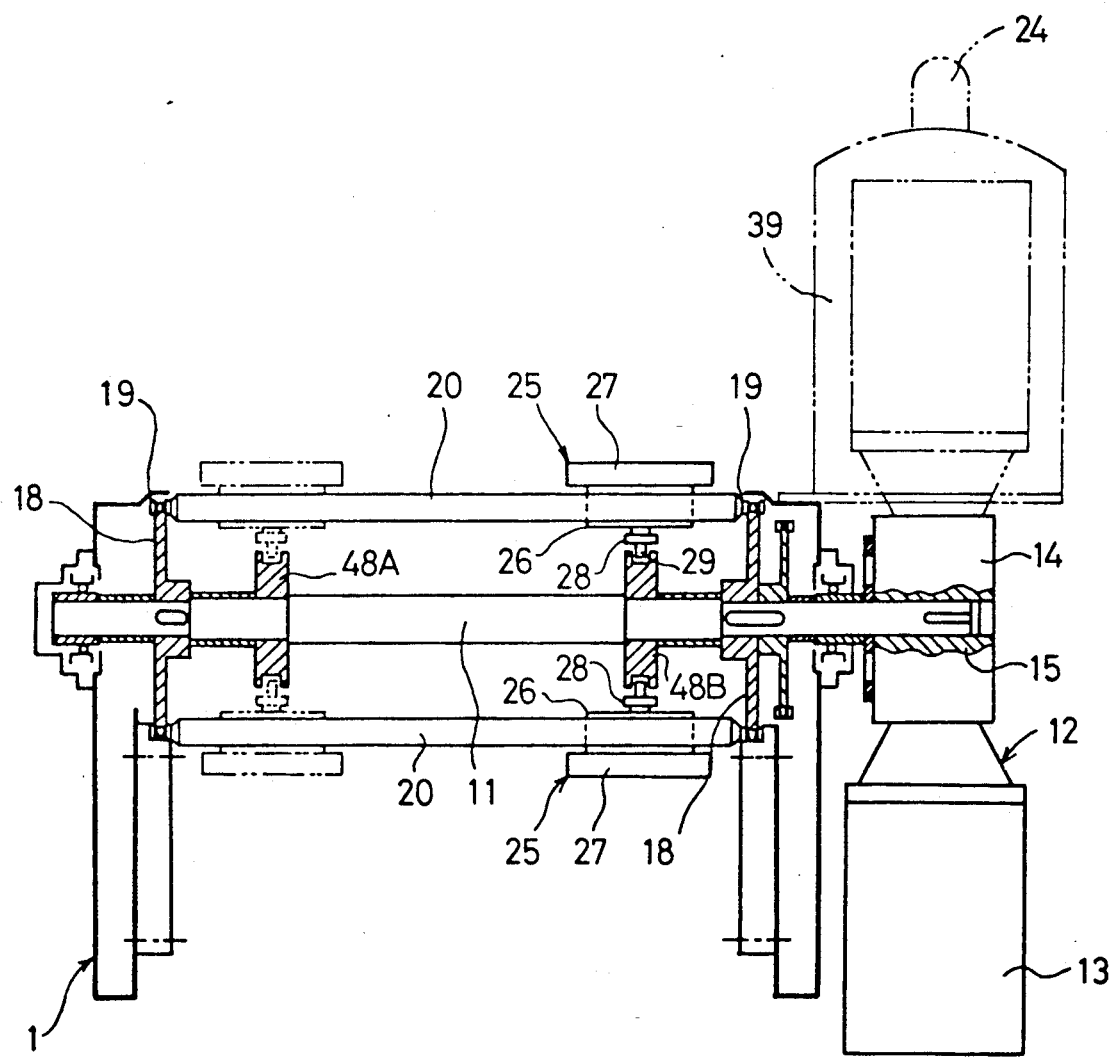
FIG. 7 is a partially cutaway front view at the termination.

At the initial end of body frame 1 is rotatably disposed a driven shaft 10 extending widthwise of the body frame 1, and at the termination is rotatably disposed a driving shaft 11 in the same manner. A driving device 12 connected in association with the driving shaft 11, as shown in FIGS. 5 through 7, has an electric motor 13 and a reduction gear 14 integral therewith, an output part thereof being formed at a hollow shaft 15. The hollow shaft 15 is desirably fitted onto an external projection of the driving shaft 11 and both the shafts 15 and 11 are connected to each other through a key or the like, the reduction gear 14 being connected at the body thereof to the body frame 1 through a torque arm 16 or the like. Chains (exemplary of the endless rotary member) are disposed between the opposite ends through sprockets 17 and 18, and between the right- and left-side chains are mounted a large number of rollers 20 exemplary of guide bar, the chains 19 each being supported and guided by both the guide rails 22 and 23.

Figure 8:
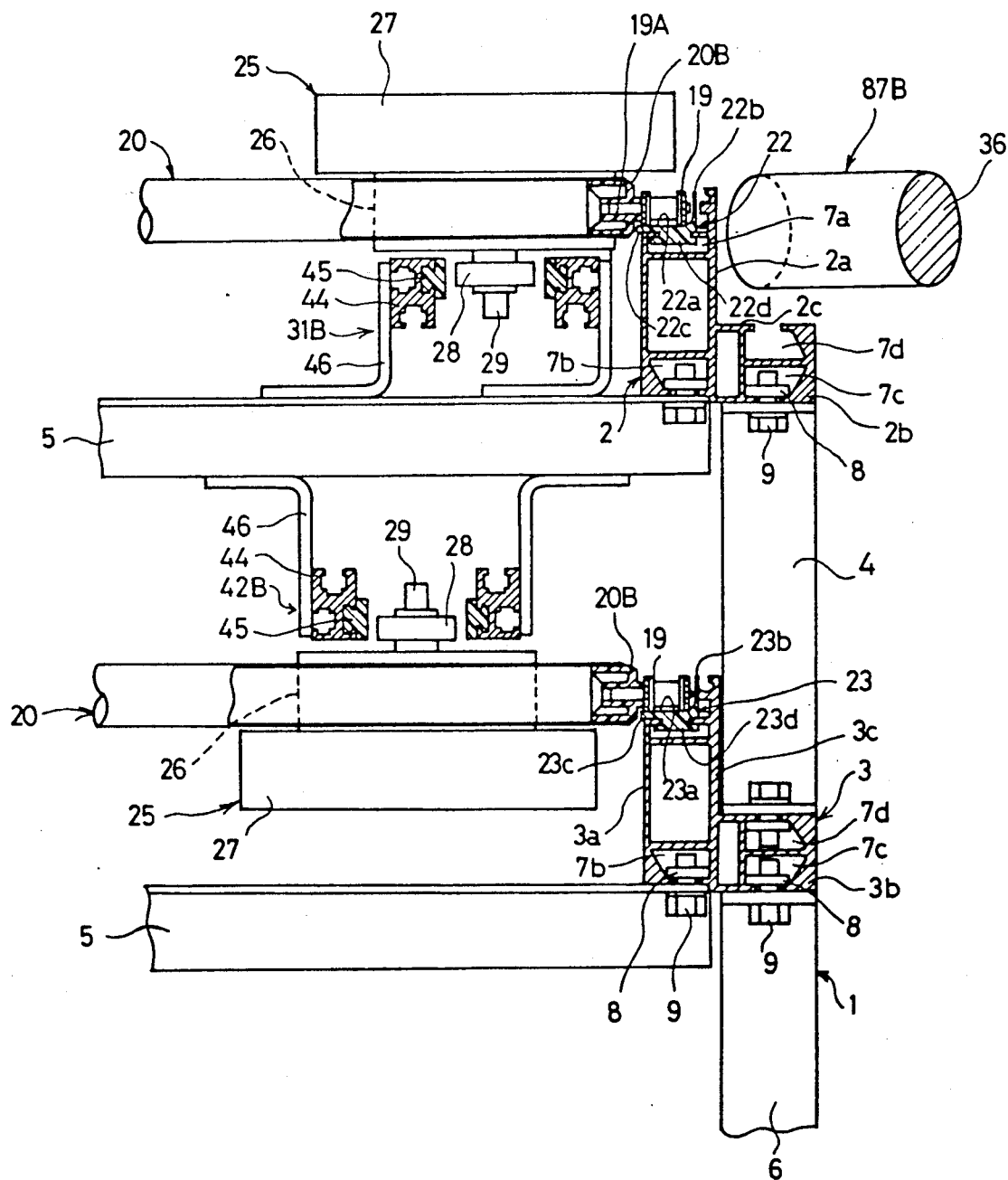
FIG. 8 is a longitudinally front view of the principal portion.
Figure 18:
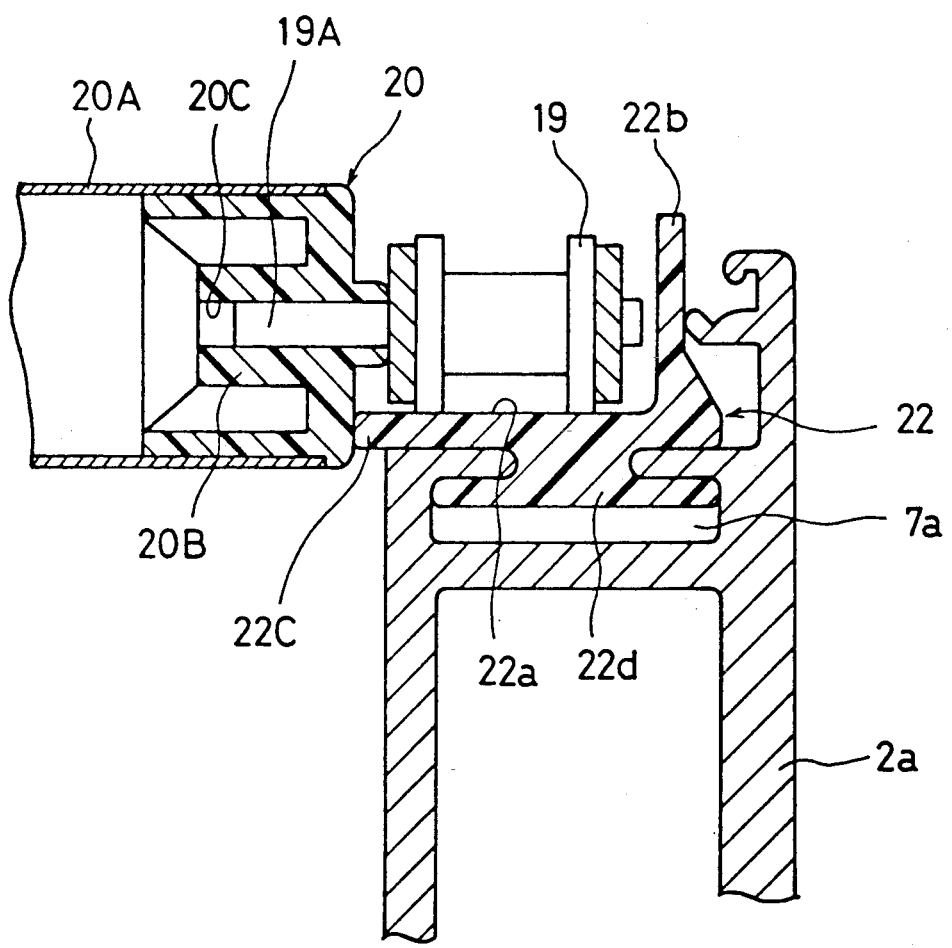
FIG. 18 is a partially enlarged front view showing the foremost ends of an upper frame member and the roller.

The roller 20, as shown in FIGS. 8 and 18, comprises a tubular portion 20A and end caps 20B fitted into both ends of the tubular portion 20A so as to be integral therewith and at the center of each end cap 20B is formed a fitting bore 20C in the axial direction of the roller. A link pin 19A of the chain 19 projects longitudinally into the roller and is tightly fitted into the fitting bore 20C, so that it is so preset that, in such connection, the end cap 20B abuts against each horizontal guide portion 22C or 23C before the link pin 19A abuts at the outer end thereof against each side cover portion 22b or 23b, the chain 19 being supported and guided at the supporting guide surfaces 22a and 23a at the guide rails 22 and 23.

Figure 19:
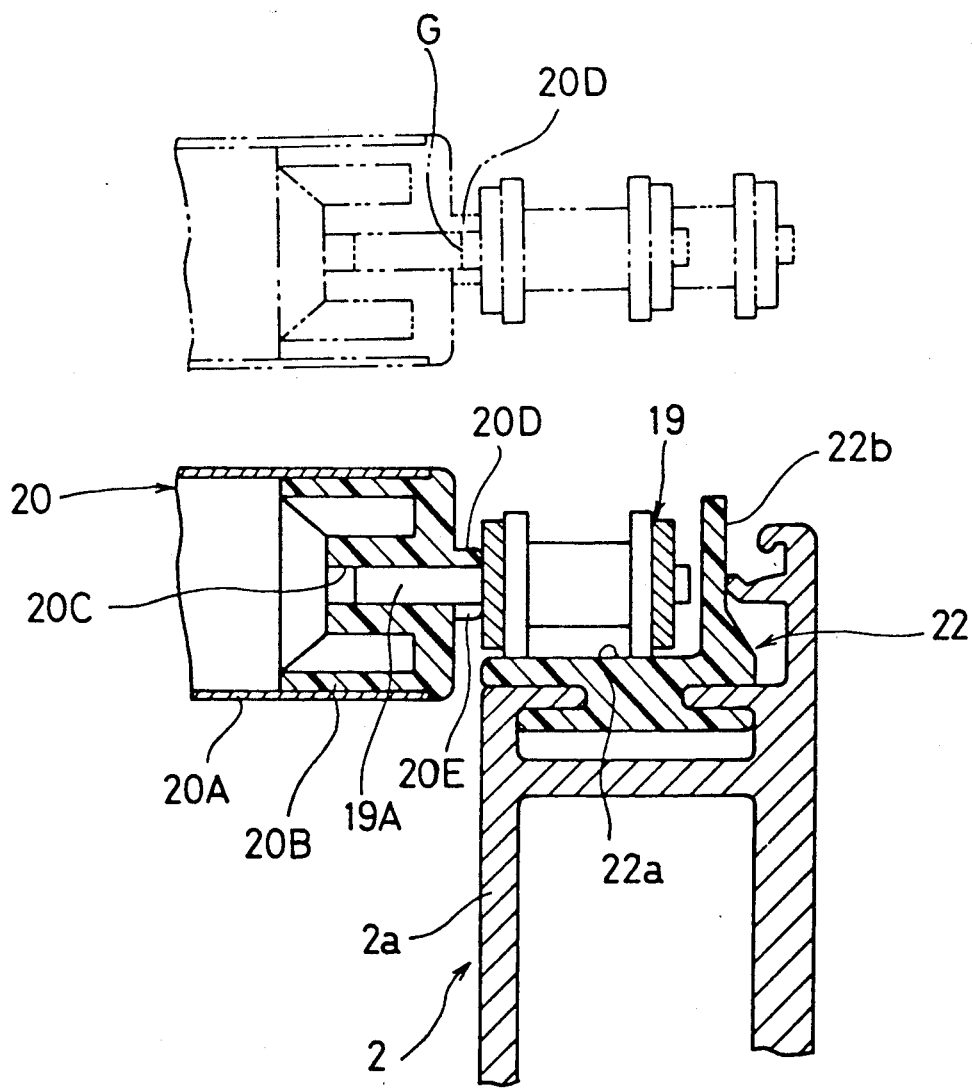
FIGS. 19 and 20 are enlarged front views showing a modified example of the same part as in FIG. 18.
Figure 20:
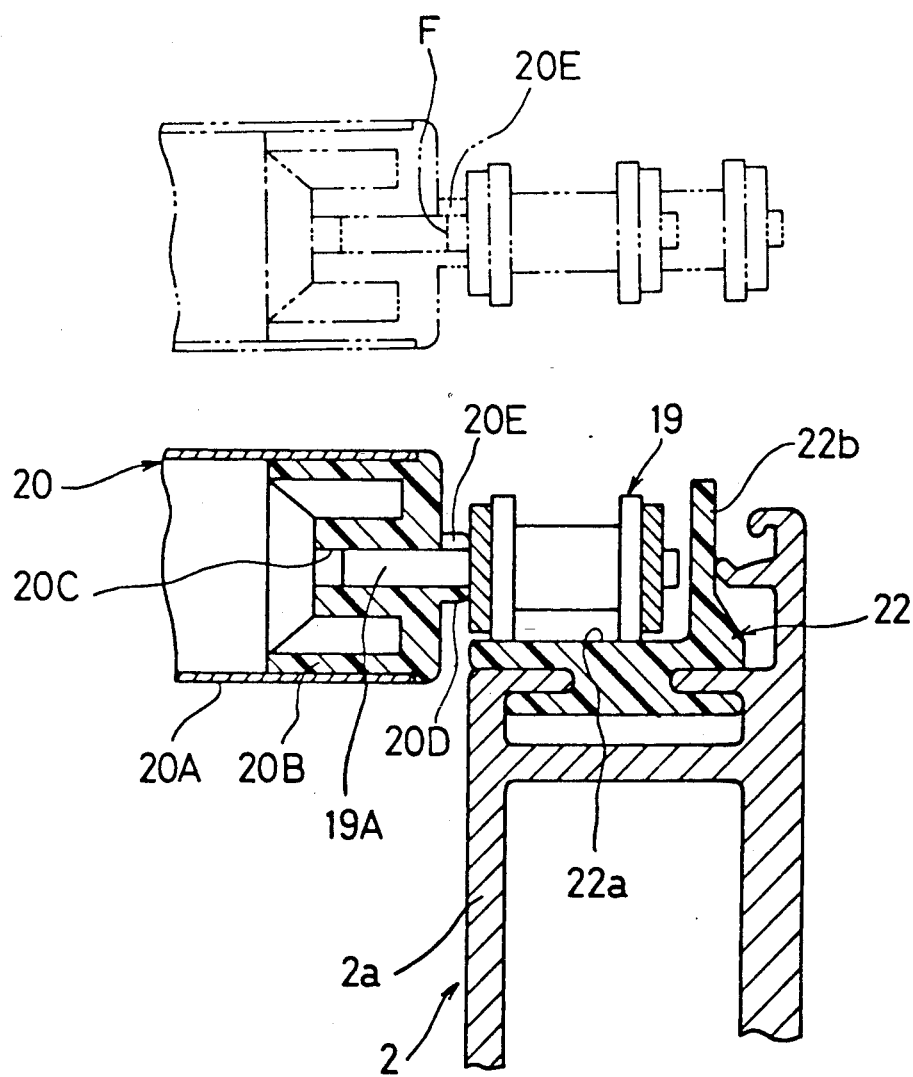
Figure 21:
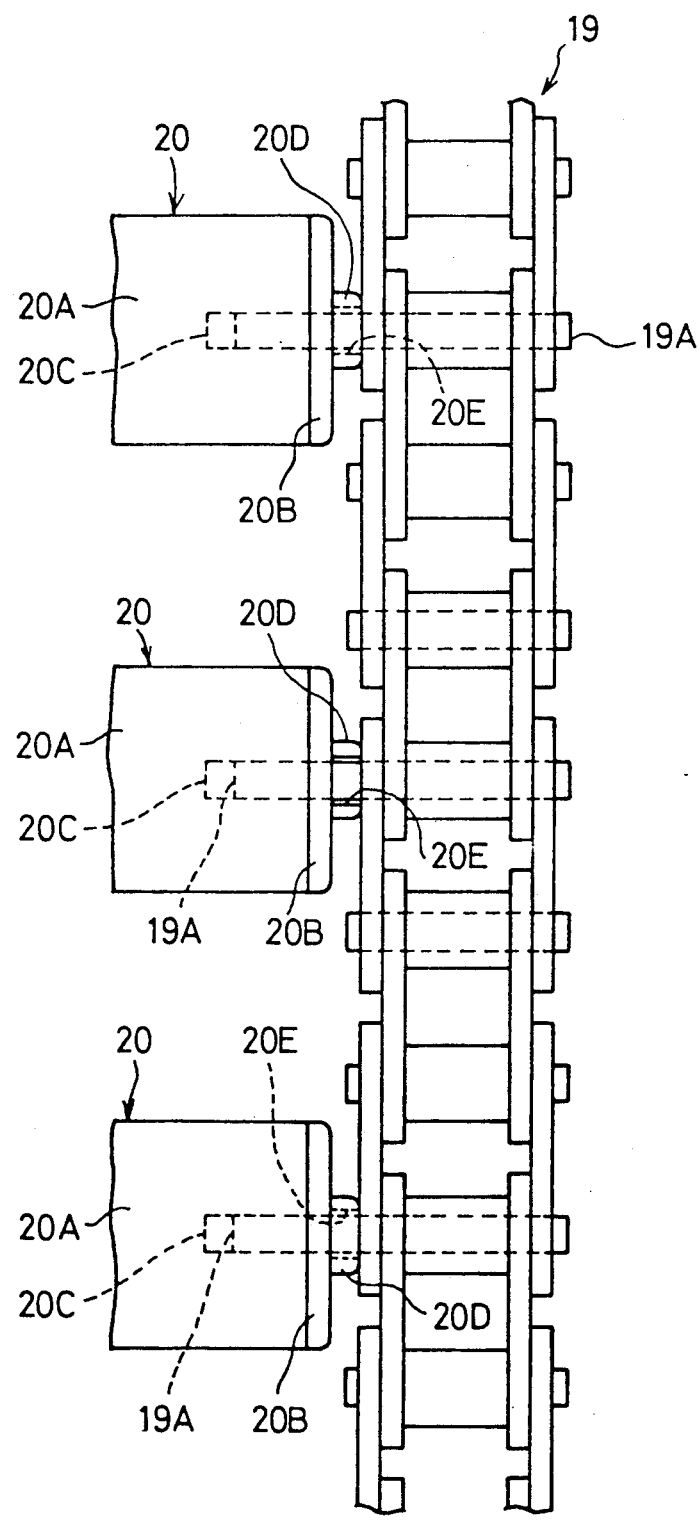
FIG. 21 is a plan view of the same.
Figure 22:
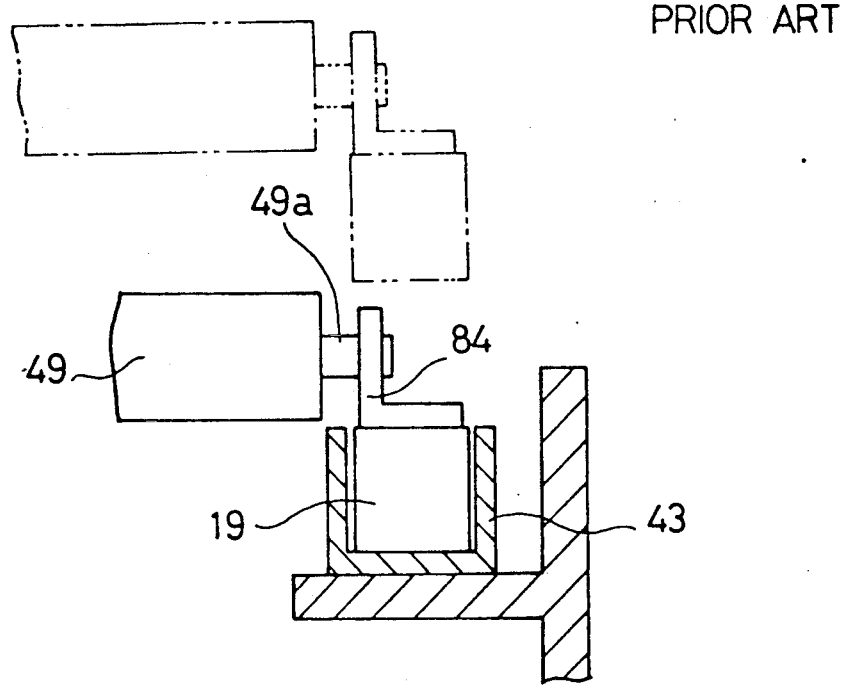
FIG. 22 is a longitudinally sectional view of the principal portion at the conventional example.
Figure 23:
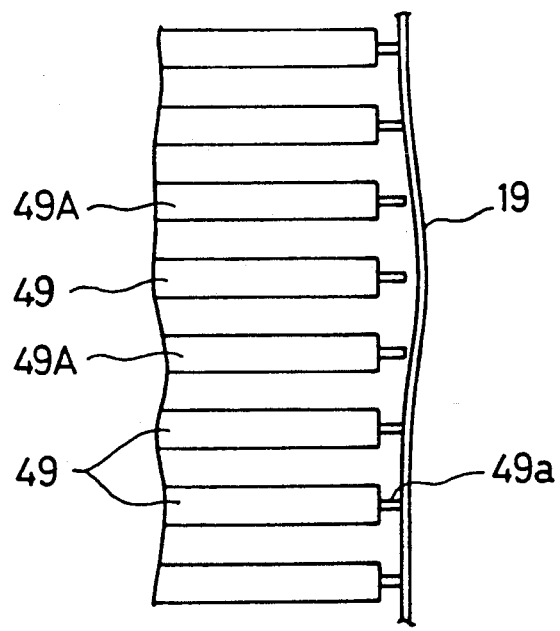
FIG. 23 is a schematic plan view of the same.

In a modified example shown in FIGS. 19 through 21, at the center of the outer surface of the end cap 20B is integrally formed an outwardly projecting annular portion 20D and at one circumferential place thereof is formed a slit portion 20E communicating with the outer end of fitting bore 20C and allowing the link pin 19A to move vertically.

The above-mentioned construction forms a main transport route 21, wherein the body frames 1 each are reduced in length (length of the apparatus) and a large number of them are disposed in a train-like manner so as to form a sufficient main transportation route 21, whereby finished articles only are shipped and, only a train-like installation work may be performed in the site. Also, the chain 19 of small-size is usable and the driving device 12 can be miniaturized and standardized so as to be directly mountable to the driving shaft 11 with the reduction gear 14 as above-mentioned. The chain 19 is supported from below and guided by the forward route side guide rail 22 and backward route side guide rail 23, wherein the backward route side is omitted near the driving shaft 11 so as to form tension part 38 by slacking the chain 19 smaller in weight and of small-size, at which time the motor 13 is miniaturized and of direct connection type, so that in comparison with the conventional construction in which the motor is disposed below the body frame and the tension part is formed apart therefrom, the tension part 38 of the invention is easy to form. In the embodiment, in the driving device 12 is mounted to the frame in a hanging manner, which may be erected as shown by the phantom line in FIG. 7, in which the cover 39 can be divised to have display function, such as a lamp 24, and further the apparatus is made of minimum height.

Figure 9:
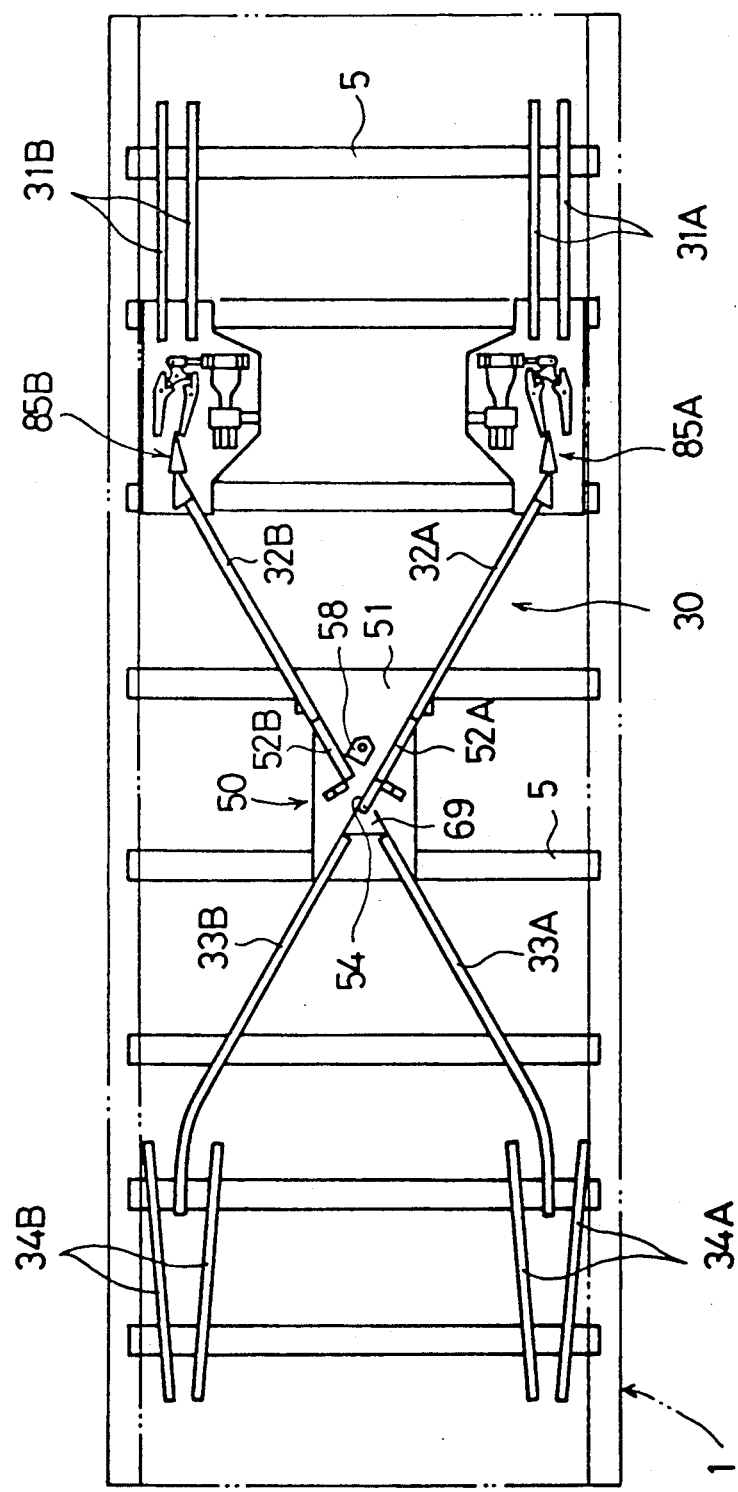
FIG. 9 is a schematic plan view showing a group of guide bodies at the forward route.
Figure 10:
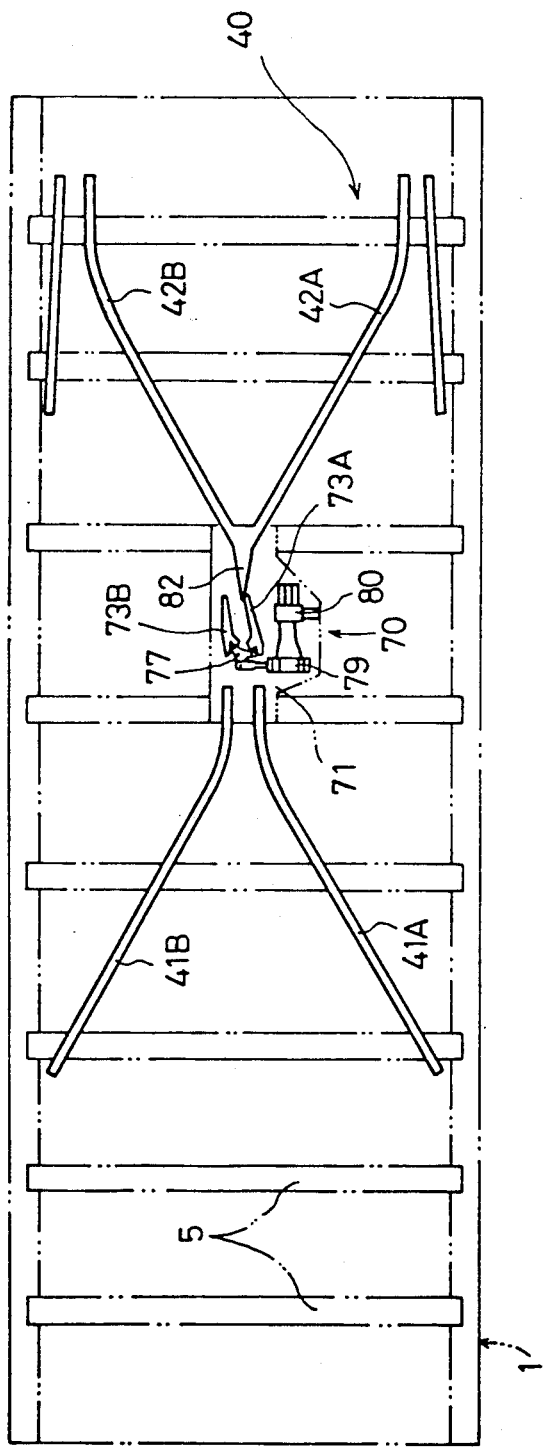
FIG. 10 is a schematic plan view showing a group of guide bodies at the backward route.
Figure 11:
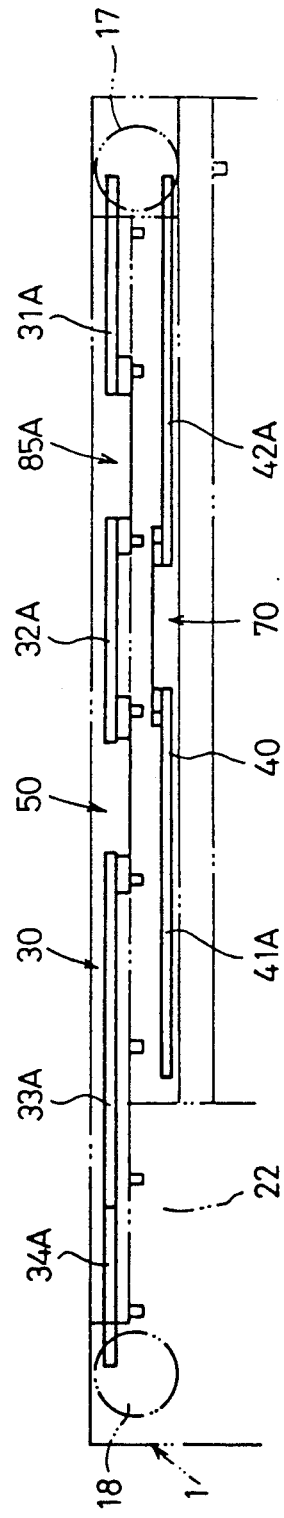
FIG. 11 is a schematic side view of the same.

Between the rollers 20 and at, for example, every third place, a movable member 25 guided by the longitudinally arranged rollers 20 to be movable widthwise is provided. The movable member 25 comprises a slide portion 26 positioned between the rollers and a laterally pushing operation portion 27 positioned at the surface of slide portion 26, and at the rear surface of slide portion 26 is mounted a guide roller 28 exemplary of the guided portion through a roller shaft 29. As shown in FIGS. 8 to 10, a number of connecting members 5 are disposed at the position of intermediate height of the body frame 1 and at the upper surface side of the connecting member, at the upper surface side of connecting members 5 are disposed forward guide members 30 for guiding the guide rollers 28 and at the lower surface side are disposed a group of backward guide members 40. At the central branch, the upper changeover device 50 at the forward route side and the lower changeover device 70 are disposed and further in the vicinity of the initial end are disposed a pair of right- and left-side separating devices 85A and 85B. The forward route guide member group 30 comprises a pair of right- and left-side initial end guide portions 31A and 31B provided at both sides of the initial end, a pair of right- and left-side inwardly moving guide portions 32A and 32B positioned, at the ends of starting end guide portions 31A and 31B, opposite to each other through the separating devices 85A and 85B, and slanting inwardly to the downstream side, a pair of right- and left-side outwardly moving guide portions 33A and 33B positioned, at the terminations of inwardly moving guide portions 32A and 32B, opposite thereto through the upper changeover device 50, and slanting outwardly toward the downstream side, and a pair of right- and left-side termination guide portions 34A and 34B disposed opposite to the terminations of outwardly moving guide portions 33A and 33B. The backward route guide member group 40 comprises a pair of right- and left-side inwardly moving guide portions 41A and 41B slanting inwardly toward the downstream side, and a pair of right- and left-side outwardly moving guide portions 42A and 42B opposite to the terminations of inwardly moving guide portions 41A and 41B and slanting outwardly toward the downstream side. The guide member groups 30 and 40, for example, as shown by the initial end guide portion 31B and outwardly moving guide portion 42B in FIG. 8, each comprise a body 44 of extrusion mold of aluminum and a guide plate 45 of resin mounted to the inner surface of the guide plate 45, the body 44 being fixed to the connecting member 5 through a bracket member 46. In addition, as shown in FIG. 7, in order that the initial and terminal turning portions guide the roller shafts 29, wheels 47A, 47B, 48A and 48B are mounted to both the shafts 10 and 11 for permitting the guide rollers 28 to be fitted therein.

The changeover device 50, as shown in FIGS. 9 and 12 through 14, has a base plate 51 fixed to the connection member 5 and at the upper surface of a half of base plate 51 at the upstream side are fixed a pair of right- and left-side guide members 52A and 52B in continuation of the inwardly slanting guide portions 32A and 32B and inclined close to each other toward the downstream side. A vertical shaft 53 is erected at the intersection of the extension lines of both the guide members 52A and 52B and a changeover member 54 is provided which is laterally swingable around the vertical shaft 53 as the fulcrum. The changeover member 54 swings laterally to be alternatively connectable with respect to both the guide members 52A and 52B, stoppers 55A and 55B being mounted through threaded adjusters 57A and 57B to blocks 56A and 56B erected on the base plate 51. A support shaft 58 is erected onto the base plate 51 between both the guide members 52A and 52B and to the support shaft 58 is rotatably mounted a rectangular-block-like receiving member 59, the receiving member 59 and changeover member 54 being connected in association with each other through a link mechanism 60. The link mechanism 60 comprises a link part 62 integrally connected to the changeover member 54, a link part 61 integrally provided with the receiving member 59, and a link 65 provided between the free ends of both the link parts 61 and 62. Accordingly, the receiving member 59 revolves to move the changeover member 54 in swinging motion through the link mechanism 60 and the changeover member 54 abuts against the stopper 55A or 55B, thereby regulating the rotation of receiving member 59. Furthermore, in order to elastically maintain the regulating position, a spring 66 laterally changeable-over with respect to the support 58 is provided between the base plate 51 and the receiving member 59. As the above-mentioned, in the state where the receiving member 59 is regulated, guide passages 68A and 68B for the guide rollers 28 are formed between one of both the side surfaces 67A and 67B of receiving member 59 and one of the guide members 52A and 52B. At the other side, the side surface 67A or 67B approaches the guide member 52A or 52B, thereby closing the guide passage 68A or 68B. In addition, at the downstream side of vertical shaft 53 and on the base plate 51 is provided a triangular-plate-like guide block 69.

The lower changeover device 70, as shown in FIGS. 1 through 4 and 10, has a base plate 71 fixed below the connecting member 5 and at the lower surface of a half of the base plate 71 at the downstream side are fixed a pair of right- and left-side guide members 72A and 72B in continuation of the inwardly moving guide members 41A and 41B, a pair of right- and left-side swinging members 73A and 73B being disposed in the state of extending toward the guide members 72A and 72B. The guide members 72A and 72B form at the downstream sides thereof cutouts between the downstream sides and the base plate 71, into which cutouts the parts of swinging members 73A and 73B at the upstream sides enter respectively. Within the cutouts, the swinging members 73A and 73B are mounted to first support shafts 74A and 74B extending downwardly from the base plate 71, thereby being made laterally swingable. Guide members 73a and 73b of, for example, urethane rubber, are attached to the swinging members 73A and 73B at the downstream side parts of the first support shafts 74A and 74B, which may be integral with the swinging members 73A and 73B. At the opposite surfaces of the swinging members 73A and 73B at the upstream side of the first support shafts 74A and 74B are formed recessed retained portions 75A and 75B open forwardly inwardly. Between both the first support shafts 74A and 74B and at the upper part, a second support shaft 76 hangs from the base plate 71, and a three-way arm operating member 77 is laterally swingably mounted to the second support shaft 76. At two arms of operating member 77 are rotatably mounted cam rollers 78A and 78B exemplary of the retaining members opposite to the retained members 75A and 75B. Between the third of operating member 77 arm and the base plate 71 is provided an air system cylinder unit 79 exemplary of an operating unit and in proximity thereto is provided a solenoid valve 80 fixed to the base plate 71. A forward edge member 82 is disposed at the position where the outwardly moving guide members 42A and 42B meet with each other, the front tip of edge member 82 entering between the rear ends of the guide members 73a and 73b. Cams of the retained members 75A and 75B with respect to the cam rollers 78A and 78B are shaped in such a manner that when one of cam rollers 78A and 78B fully engages with the retained portion 75A or 75B corresponding thereto, the guide member 73a or 73b at the one engaging cam roller side leaves the edge member 82 and at the other side approaches the same so as to form a guide passage 81A or 81B to the one side, and at an intermediate position where the operating member 77 is moved in swinging motion from this state to disengage the cam roller 78A or 78B from the retained portion 75A or 75B, one of the guide members 73a and 73b moves close to the edge member 82 and the other maintains its close state thereto. In addition, an approach switch 83 for detecting arrival of guide roller 28 is provided at the guide member 72 at the somewhat upstream side of the second support shaft 76.

The separating devices 85A and 85B are basically the same as the changeover device 70 and the detailed description of them are omitted, which differ only in that they are mounted slantwise corresponding to the route to be separated. Utilizing the same construction can lower manufacturing cost due to mass production and an improvement in reliability.

As shown in FIG. 5, outside both sides of body frame 1 are provided branch conveyers 87A and 87B forming branch routes 86A and 86B slanting downwardly and outwardly with respect to the main transport route 21, the branch conveyers 87A and 87B having a number of rollers 36 whose ends are positioned in the stepped portion 2c of the upper frame member 2 and disposed in the state of being fully close to the vertical member 2a. In addition, the outside upward dovetail groove 7d at the upper frame member 2 is usable for connecting the branch conveyers 87A and 87B with the frame member 2. In FIG. 5, reference numeral 88 designates an article.

Next, explanation will be given on transport and branch operation for articles in the above-mentioned embodiment.

The motor 13 at the driving device 12 is operated to rotate the hollow shaft 15 of reduction gear 14, so that the sprockets 17 are forcibly rotated through the driving shaft 11 fitted into the hollow shaft 15, thereby enabling both the chains 19 to be supportingly guided by the guide rails 22 and 23 and be movable. Therefore, since the group of rollers 20 are circulated, the article 88 supplied on the roller 20 at the initial end is transported on the main transport route 20, at which time the movable members 25 integrally moving with the group of rollers are guided by the guide member groups 30 and 40 so as to move widthwise in reciprocation through the slide portions 26 or to linearly move along the main transport route 21.

In other words, for example, in FIG. 9, the guide roller 28 guided by the initial guide portions 31A at one side, when the separation device 85A is in a linear separate posture, is guided in a straight forward direction and moves straight without being subjected to the guide action and thereafter is guided to the termination guide portion 34A. Hence, the movable members 25 do not act on the article 88, which is linearly transported on the main transport route 21. Incidentally, at the reverse side, the guide roller 28 at the initial end guide portion 31B, similarly to the above, linearly moves from the separation device 85B to the termination guide portion 34B.

The guide roller 28 guided by the one-side initial end guide portion 31A, when the separation device 85 is in the slantwise separating posture, is guided slantwise inwardly; guided by the inwardly moving guide portion 32A to move inwardly; transferred to the outwardly moving guide portion 33B through the upper changeover device 50; guided by the outwardly moving guide portion 33B to move outside; and thereafter guided to the termination guide portion 34B. Therefore, the group of movable members 25 traverses the main transport route 21 while moving in the transport direction, resulting in the article 88 being laterally pushed thereby to be transferred to the branch conveyer 87B at the exterior.

At that time, the rollers 20 and chain 19 move in the same direction, the movement of which is regulated by the end cap 20B abutting against the lateral guide portions 22c or 23c and the outer end of link pin 19A at the chain 19 never abuts at the outer end of pin 19A against the side cover 22b or 23b. The side covers 22b and 23b prevent a foreign object from contacting the chain 19 or the like from the outside.

In addition, at the reverse side, similarly, the guide roller 28 at the initial end guide portion 31B is guided to the separation device 85B, inwardly moving guide portion 32B, upper changeover device 50, outwardly moving guide portion 33A, and termination guide portion 34A in this order, so as to transfer the article 88 to the branch conveyer 87A, at which time the article 88 on the roller 20 rides over the vertical member 2a supporting the chain 19 and then transfers to the roller 36 positioned at the stepped portion 2c.

Figure 12:
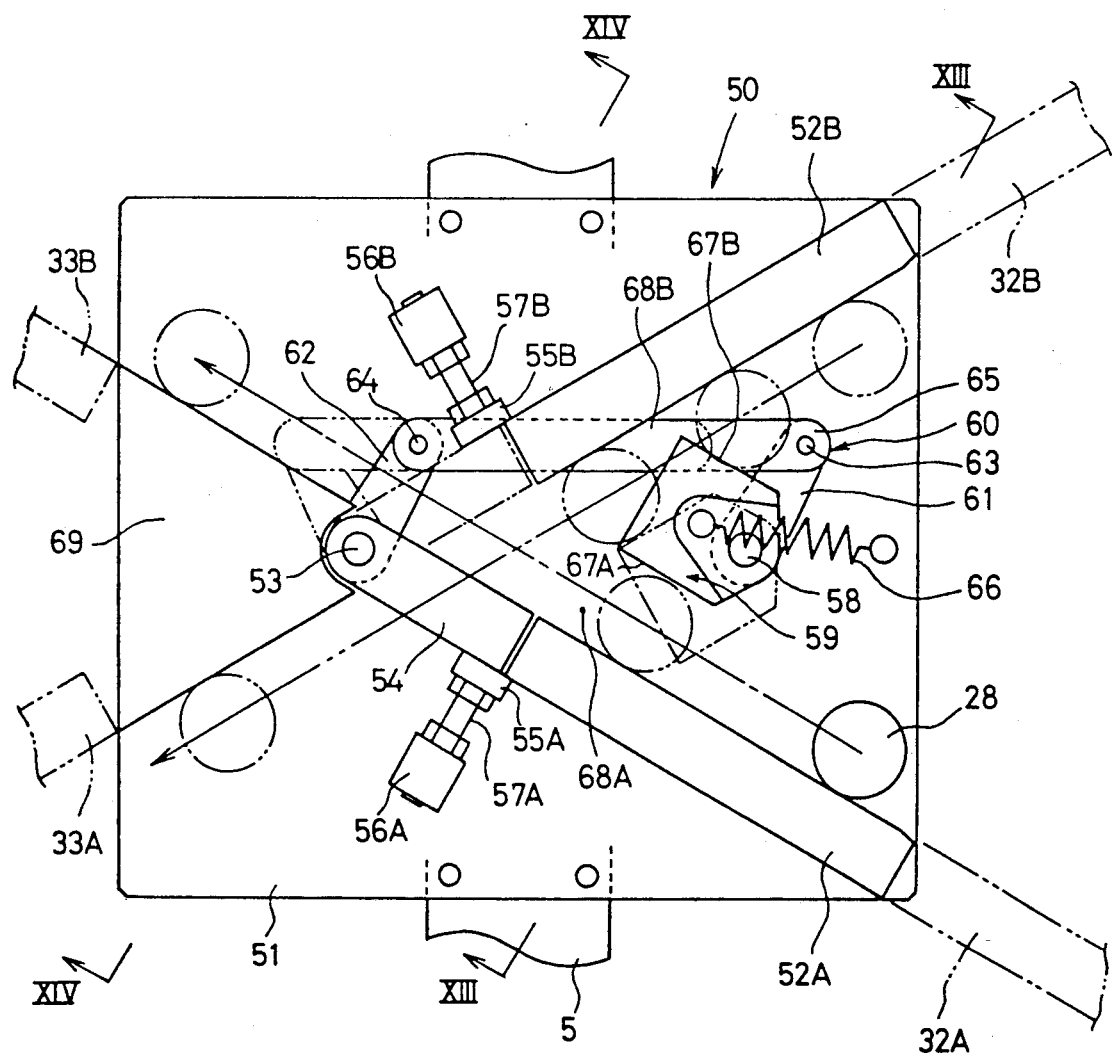
FIG. 12 is a plan view of an upper changeover device.
Figure 15:
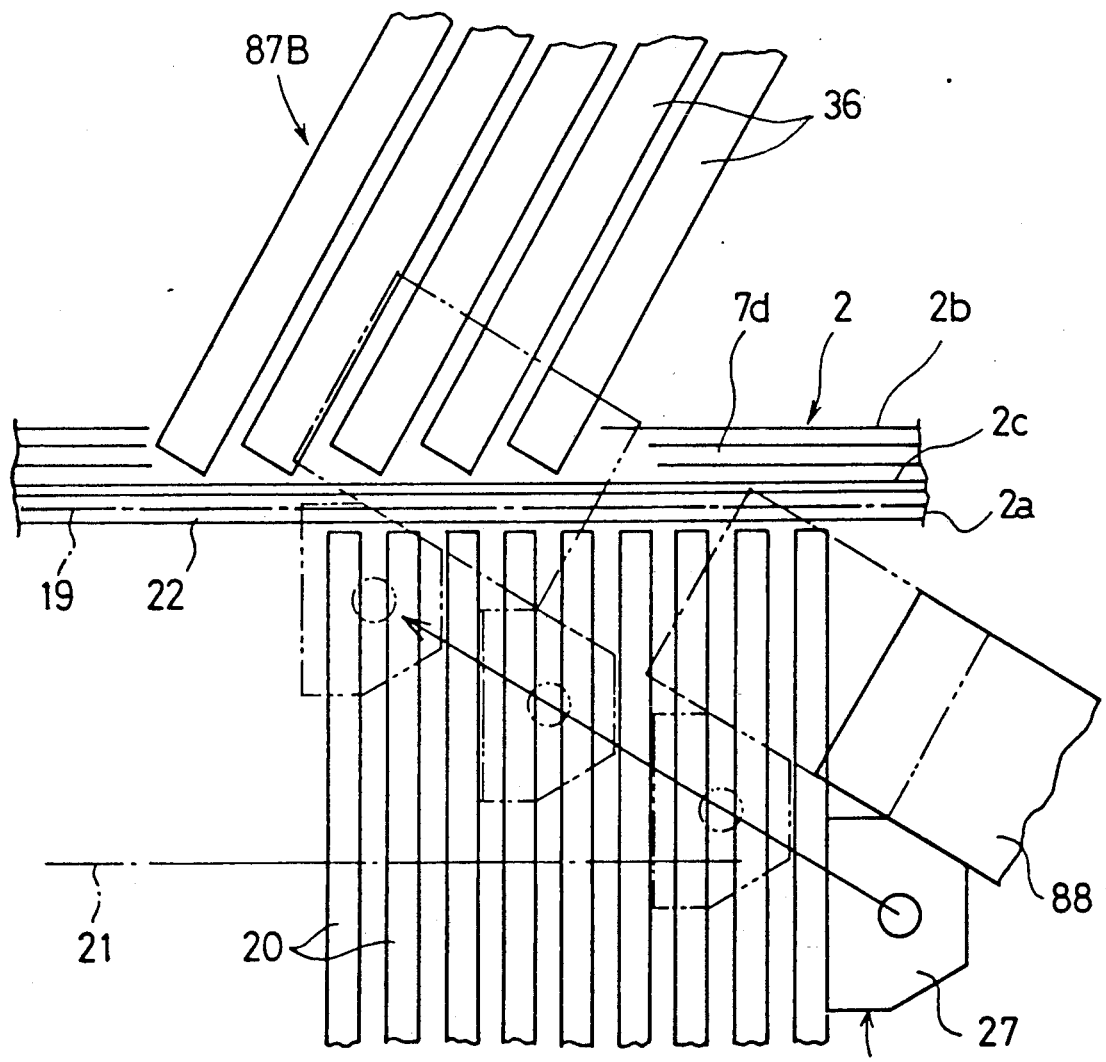
FIG. 15 is a partially enlarged plan view showing transfer of articles to the branch transportation route at the reverse side to that in FIG. 5.
Figure 16:
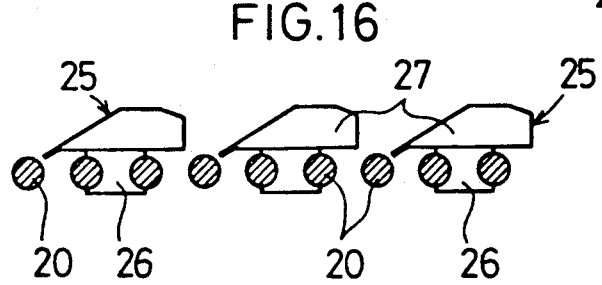
FIG. 16 is a longitudinally sectional side view of the same.
Figure 17:
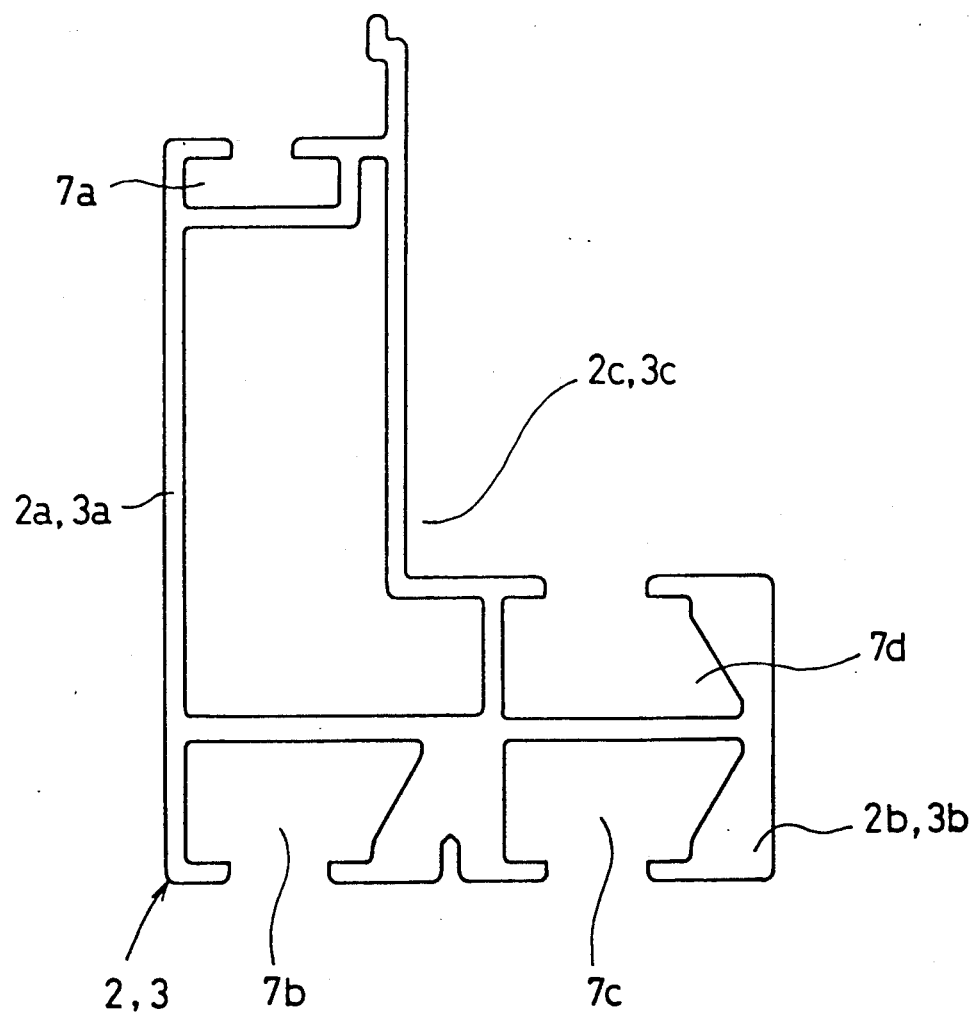
FIG. 17 is a front view of a frame member.

At the upper changeover device 50, for example, as shown by the solid line in FIG. 12, in the state where the changeover member 54 connects with the guide member 52A and a guide route 68A is formed between the guide member 52A and the side surface 67A of the receiving member, the guide roller 28 guided by the inwardly moving guide portion 32A transfers to the guide member 52A, passes the guide route 68A, and then moves from the changeover member to the outwardly moving guide portion 33B through the guide block 69, at which time the changeover member 54 abuts against the stopper 55A, its abutting force being applied with a spring 66. In the state as shown by the solid line in FIG. 12, when the guide roller 28 is guided from the inwardly moving guide portion 32B to the guide member 52B in the state as shown by the solid line in FIG. 12, since the guide passage 68B is closed by the side surface 67B, the guide roller 28 abuts thereagainst. Then, the receiving member 59 is subjected to a pushing force of pushing it toward the guide member 52A by a moving force of guide roller 28, thereby rotating around the support shaft 58 against the spring 66. In other words, the receiving member 59, as shown by the phantom line in FIG. 12, rotates to form a guide passage 68B between the guide member 52B and the side surface 67B of receiving member 59 and the opposite side surface 67A thereof closes the guide passage 68A. The rotation of receiving member 59 is transmitted to the changeover member 54 through the link mechanism 60 to thereby swing the changeover member 54 around the vertical shaft 53 so as to abut against the stopper 55B. Accordingly, the guide roller 28, which automatically rotates the receiving member 59, passes the guide passage 68B and thereafter moves through a guide block 69 toward the outwardly moving guide portion 33A from the changeover member 54 almost simultaneously changed over.

As the above-mentioned, the guide rollers 28 upon reaching the ends of terminate guide portions 34A and 34B are guided by the wheels 48A and 48B and inverted and thereafter guided by the inwardly moving guide portions 41A and 41B so as to move toward the widthwise center. The guide rollers 28 are separated right and left by the lower changeover device 70 (to be discussed below), guided by the outwardly moving guide members 42A and 42B so as to be moved outside, guided by the wheels 47A and 47B to be inverted, and thereafter transferred to the initial end guide portion 31A or 31B.

Figure 2:
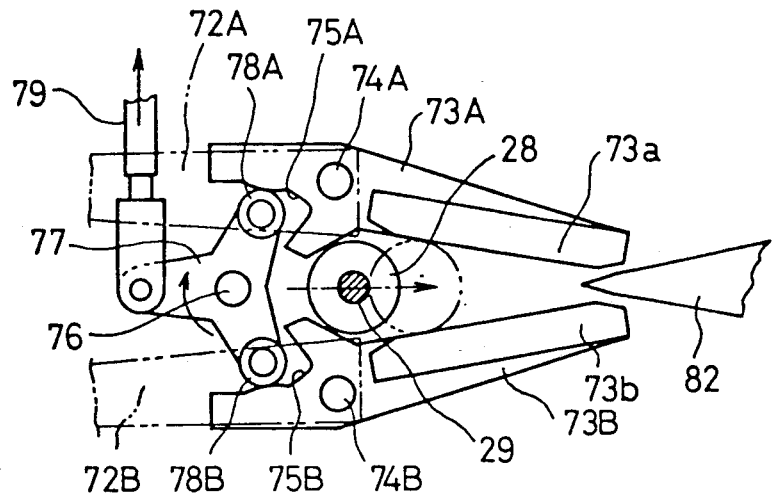
FIGS. 2 and 3 are illustrations of operation thereof.
Figure 3:
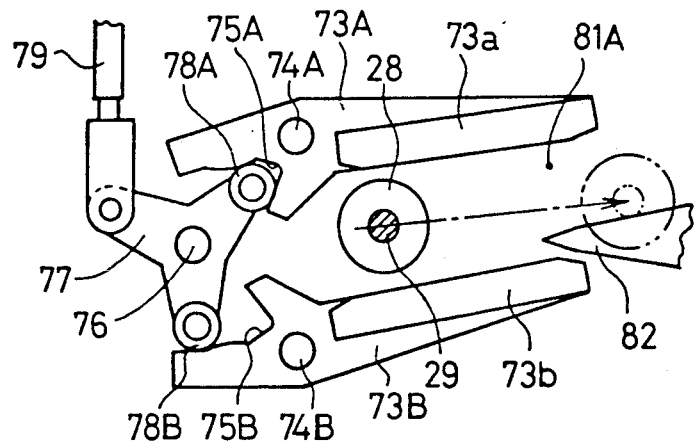
Figure 4:
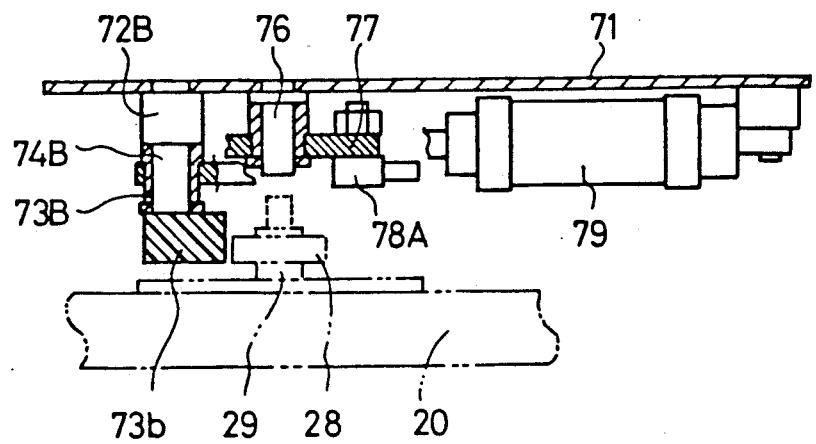
FIG. 4 is a sectional view taken on the line VI—VI in FIG. 1.

At the lower changeover device 70, for example, as shown in FIG. 1, when the cylinder 79 is extended to swing the operating member 77 counterclockwise around the second support shaft 76, one cam roller 78A leaves the retained portion 75A to swing the swinging member 73A inside around the first support shaft 74A and the guide member 73a of swinging member 73A approaches the edge member 82. Also, the other cam roller 78B engages with the retained portion 75B so as to swing the swinging member 73B outside around the first support shaft 74B, thereby moving the guide member 73b away from the edge member 82. In other words, simultaneously with closing the one guide passage 81A, the other guide passage 81B is open. Accordingly, the guide roller 28, which is moved to the widthwise center by one of the inwardly moving guide portion 41A or 41B, passes between both the guide members 73a and 73b to transfer to the other guide passage 81B, and is guided by the outwardly moving guide portion 42B through the edge member 82 for guiding the roller shaft 29, at which time the guide roller 28 is guided by one guide member 73a so that the tip of edge member 82 is prevented from colliding with the roller shaft 29. After a branching command is given corresponding to the article to be transported, the branch waits the timing. When the objective roller shaft 29 (guide roller 28) approaches to turn on the approach switch 83, the solenoid valve 80 is switched to retract the cylinder 79 and the operating member 77 swings clockwise. At an intermediate position of swinging movement, as shown in FIG. 2, one cam roller 78A does not yet engage with the retained portion 75A, whereby the swinging member 73A maintains its inwardly swinging posture to protect the edge member 82. The other cam roller 78B leaves the retained portion 75B to allow the swinging member 73B to swing inwardly around the first support shaft 74B and the guide portion 73b approaches the edge member 82 to protect it. In other words, both the guide portions 73a and 73b protect the edge member 82 and close both the guide passages 81A and 81B, at which time the guide roller 28 passes part of second support shaft 76 and is positioned just before abutting against both the guide members 73a and 73b. Then, the guide roller 28 abuts thereagainst, at which time the retraction of cylinder 79 and clockwise swinging motion of operating member 77 continue, so that the operating member 77 simply escapes from the dead point (neutral position) by contact pressure and one swinging member 73A. swings around the first support shaft 74A. Hence, as shown in FIG. 3, one guide passage 81A is formed, so that the guide roller 28, which has passed between both the guide members 73a and 73b, transfers to the one guide passage 81A and then is guided to the one outwardly moving guide portion 42A through the edge member 82 for guiding roller shaft 29. In addition, in the state of FIG. 2, when the guide roller 28 abuts against both the guide members 73a and 73b in advance of the scheduled time, both the swinging members 73A and 73B are expanded therebetween by the guide roller 28 to lead to a fear of breakdown. In this case, since the guide members 73a and 73b are formed of urethane rubber, the operating member 77 can escape from the dead point by utilizing the time of deformation of the urethane rubber, thereby preventing a breakdown in both the swinging members 73A and 73B.

In the above-mentioned embodiment, the upper changeover device 50 of automatic changeover system has been described, which may be the same control system as the lower changeover device 70. When such control system is adopted to the upper changeover device 50, on the main transportation route 21 the group of movable members 25 can be moved in a C-like manner, thereby enabling the article 88 to be moved widthwise left or right on the main transport route 21.

In the above-mentioned embodiment, the system of transferring the articles 88 from the main transportation route 21 to the right- and left-side conveyers 87A and 87B has been described, which may be of the system that the upper and lower changeover devices 50 and 70 are removed, so that a changeover device of the same construction as the lower changeover device 70 may be disposed at one separation device to thereby transfer the article 88 to the branch conveyer disposed at one side.

In a modified embodiment shown in FIGS. 19 through 21, the chain 19 and roller 20, as shown by the solid line in FIG. 19, are maintained in the coupling state without disengaging, because a link pin 19A is long enough and the chain 19 is prevented by side covers 22b and 23b from laterally shifting. When operation of the conveyer is stopped for repairing the roller 20 and movable member 25, at first an objective roller 20 is rotated with respect to the link pin 19A so that, as shown by the solid line in FIG. 2 and FIG. 3, the slit part 20E is positioned just above the link pin 19A. One or a plurality of rollers 20 positioned front and rear of the objective roller 20 are rotated with respect to the link pin 19A so that, as shown by the solid line in FIG. 19 and FIG. 21, the slit portion 20E is put downwardly (or laterally) and the annular portion 20D is positioned just above the link pin 19A. In this state, part of the chain opposite to the objective roller 20, as shown by the phantom line in FIG. 19, is lifted together with the roller 20. Simultaneously, as shown by the phantom line in FIG. 19, the adjacent part is lifted. Next, part of chain is outwardly moved to pull out the link pin 19A from the fitting bore 20C, and before it is completely pulled out, the link pin 19A, as shown by the phantom line F in FIG. 20, is opposite at the inner end to the slit 20E, whereby, when the link pin 19A passes in the slit portion 20E, the objective roller 20 disengages from the link pin 19A, but the adjacent roller 20, as shown by the phantom line G in FIG. 19, does not disengage from the link pin 19A, because the inner end thereof is opposite to the annular part (not-slit) 20D. Hence, the objective roller 20 or movable member 25 only can be removed, which are assembled also by the reverse procedure.

Figure 24:
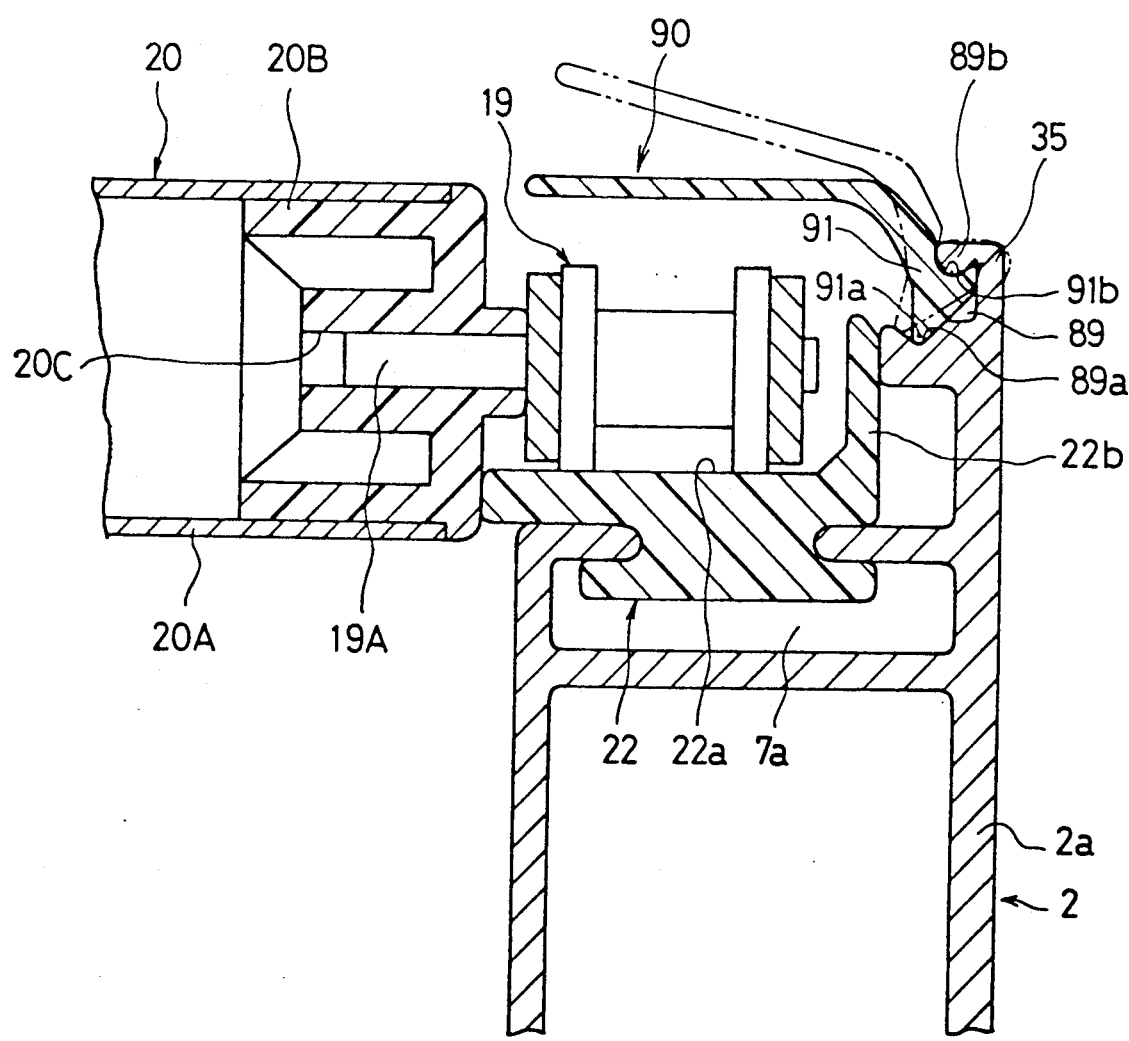
FIG. 24 is an enlarged front view of another modified example of the same part as in FIG. 18.
Figure 25:
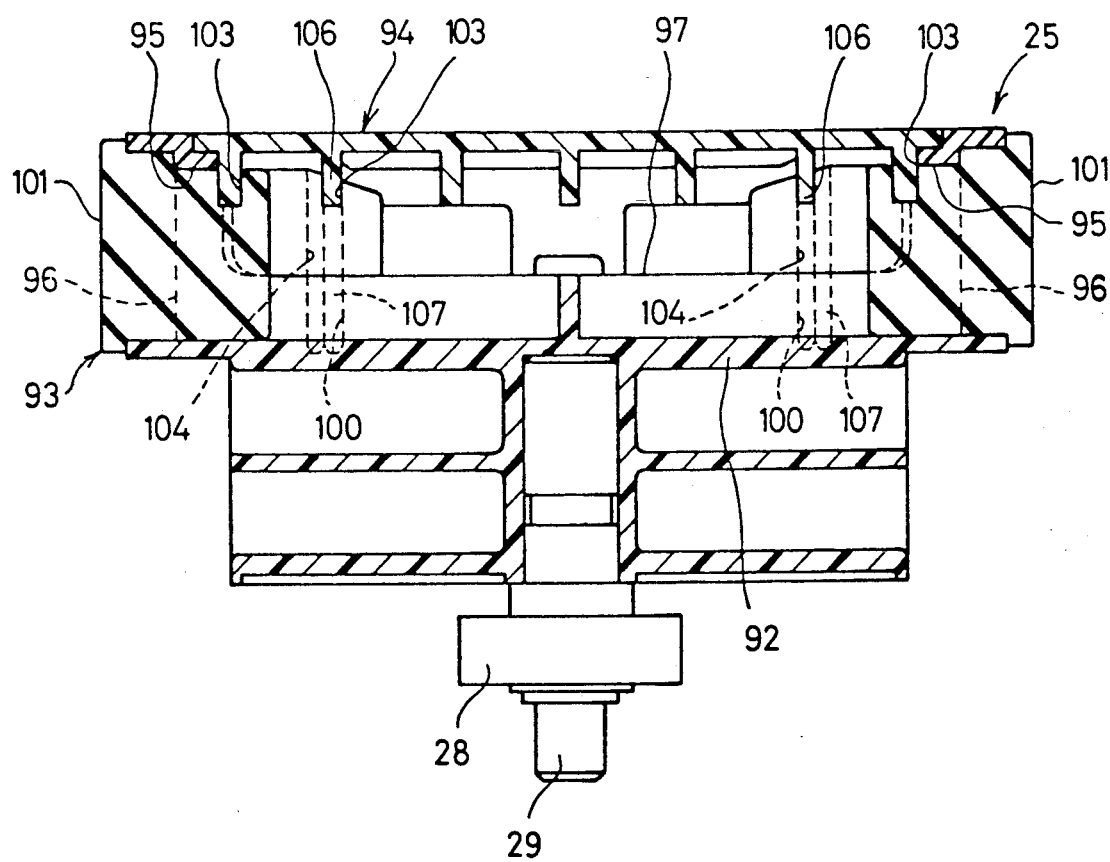
FIG. 25 is a longitudinally sectional front view of a movable member for laterally moving an article on a main transport route.
Figure 26:
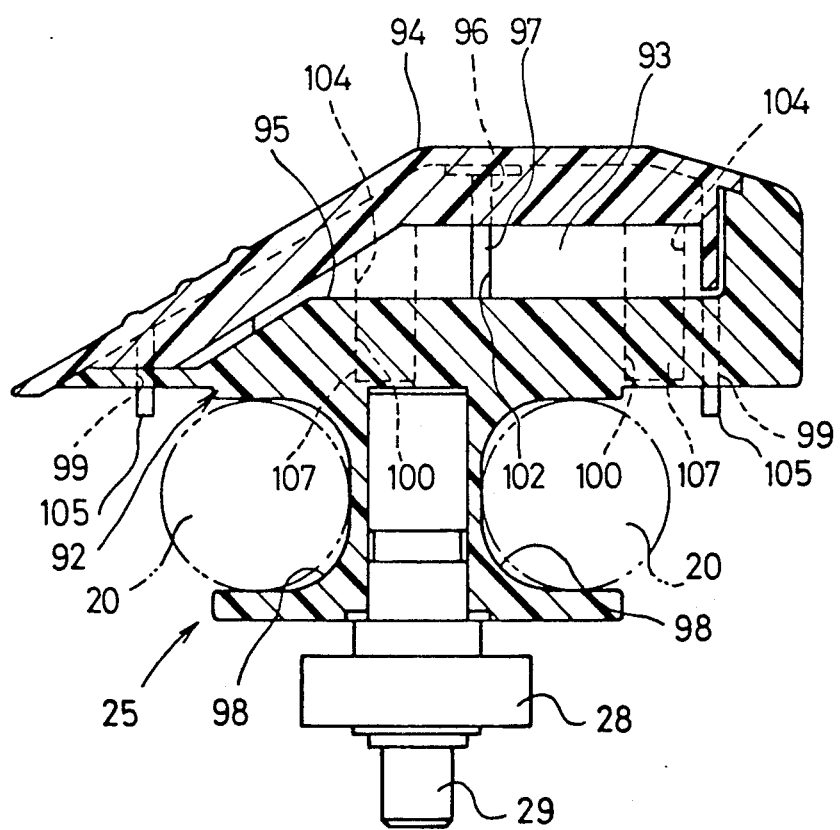
FIG. 26 is a longitudinally sectional side view of the same.
Figure 27:
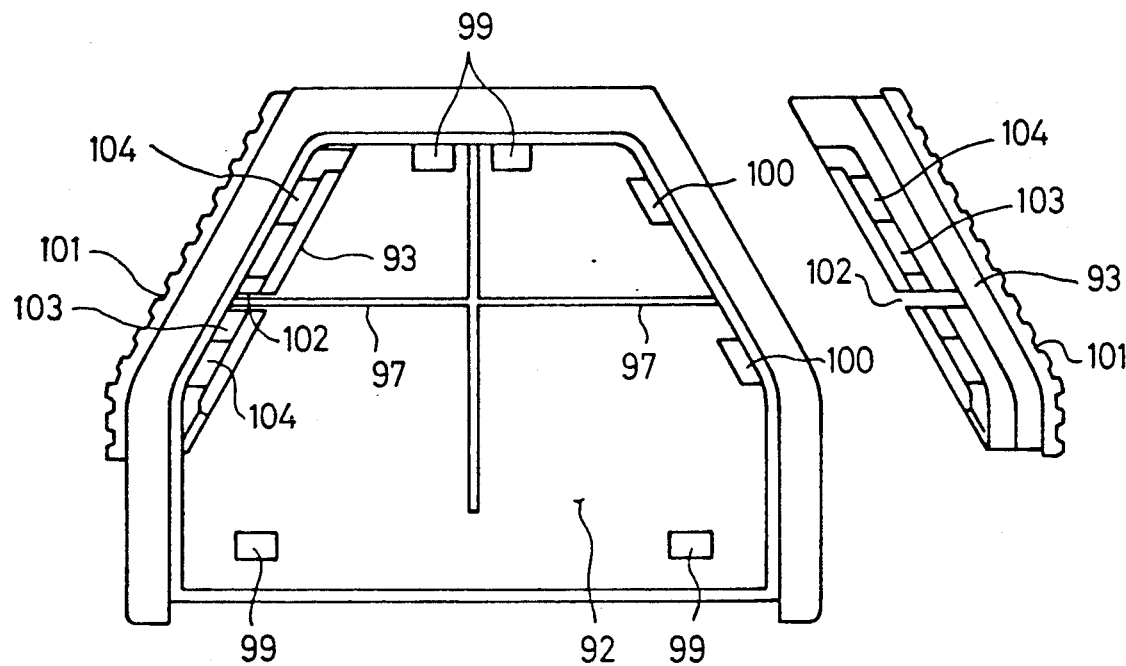
FIG. 27 is a partially cutaway plan view of the same.
Figure 28:
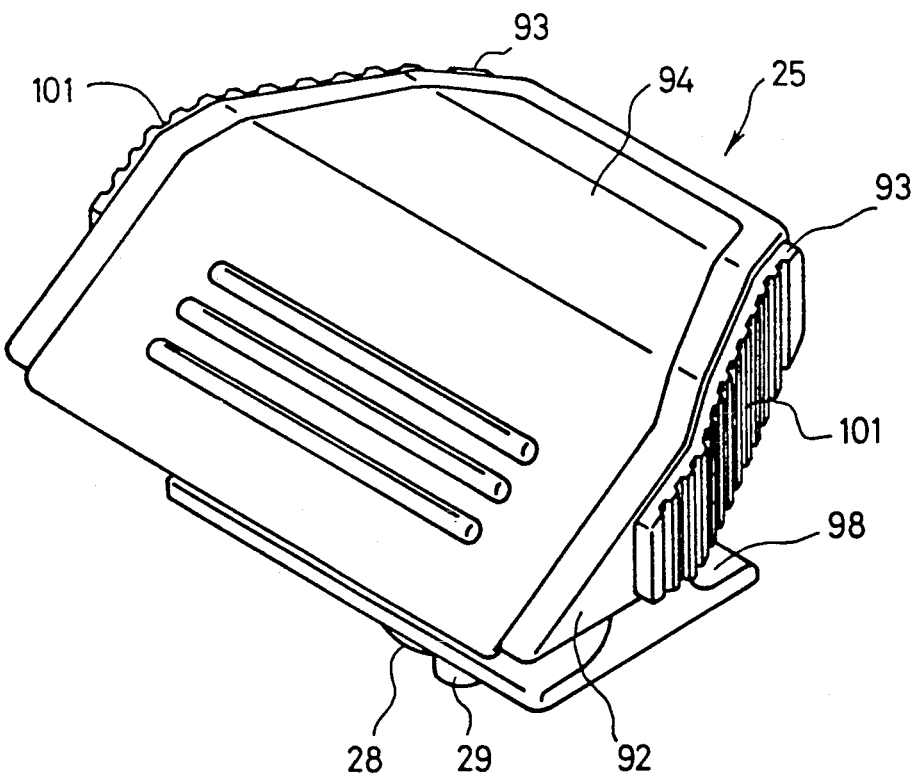
FIG. 28 is a schematic side view of the same.

In a modified embodiment of the invention shown in FIG. 24, elastic holding parts 35 are provided at the upper ends of both the frame members 2 and 3 and each have retaining grooves 89 extending entirely lengthwise. Each retaining groove 89 is open inwardly upwardly and provided at the bottom with a V-like-shaped receiving part 89a and a hook-like-shaped free end projecting in a circular arc is formed at the lower surface of the free end of holding part 35.

At this modified embodiment, the chain 19 is covered at the upper portion by a cover body 90 of resin mold and of elongate-plate-like shape. In other words, as shown by the solid line in FIG. 24, a retained portion 91 engages with the retaining groove 89 against an elastic force of the elastic holding part 35, in which a projection 91a is fixedly fitted into the receiving part 89a and the fitting part 89b is fitted into a recess 91b, so that the cover 90 is supported to the upper frame member 2 in a horizontally covering manner. Accordingly, the cover 90 stops dust intended to attach to the chain 19 and prevents a worker's clothing from being caught thereby. When the operation of the apparatus is stopped to carry out maintenance and inspection of the chain or the like, the retained part 91 is disengaged from the retaining groove 89 against the elasticity of elastic holding part 35 to remove the cover 90. In other words, the cover 90 is held at the inner end thereof by the worker's hand to be turned upwardly, whereby, while the projection 91a is being removed from the recess 89a, the cover 90 is removable. At this time, the elastic holding part 35 is deformed upwardly and outwardly against its elasticity. In addition, the cover 90 need only be mounted by the reverse procedure.

The movable member 25, as shown in FIGS. 25 through 28, comprises a shoe body 92 positioned between the rollers 20, a rubber body 93 detachably fitted to the shoe body 92 from the lateral side, and a cover 94 detachably mountable from above with respect to the shoe body 92, and at the rear surface of shoe body 94 is mounted the guide roller 28 exemplary of the guided part through the roller shaft 29. The shoe body 92 is a frame of resin and open at the upper and front surfaces and through-bores 95 are formed laterally of the side surfaces slanted when viewed in the plane. At an intermediate portion longitudinally of the through-part 95 a vertical member 96 and horizontal member 97 in continuation thereof is provided. At the lower portion of shoe body 92 are formed sliding guide recesses 98 open forwardly and rearwardly and the guide roller 28 is mounted at an intermediate portion of the rear surface of each sliding guiding part 98 through the roller shaft 29. A pair of retaining bores 99 are formed at the front and rear end portions of part of shoe body 92 corresponding to the bottom thereof and at both lateral sides of shoe body inside from the through-bores 95 are formed a pair of through-bores 100, these retaining bores 99 and through-bores 100 being rectangularly formed respectively. The rubber bodies 93 detachably fitted from the lateral side through through-bores 95 are formed into frictional-abutting surfaces 101 of rough surface when viewed in the plane in the state where the rubber bodies 93 abut against the shoe body 92 respectively. At the fitting portion are formed vertical grooves 102 into which both the members 96 and 97 are insertable and also formed horizontal grooves 103 open at the upper surface of shoe body 92. Furthermore, horizontal bores 104 desirably coincident with the through bores 100 are formed. The cover body 94 covers the upper surface and front surface of shoe body 92, is formed of resin, and has at the front and rear portions retaining members 105 hanging to be detachably engageable with the retaining bores 99, the retaining members 105 being in the engageable posture by elasticity of itself. Furthermore, vertical members 106 engageable from above with the horizontal grooves 103 are provided in a hanging manner and are extended to form fitting portions 107 to be desirably fitted into the horizontal grooves 102 and through-bores 100.

The movable member 25 is assembled in such a manner that at first a pair of rubber bodies 93 are set with respect to the shoe body 92 by being fitted from the lateral side into the through-parts 95, which is carried out until the rubber bodies 93 abut at the outside thereof against the side surfaces of shoe body 92, at which time the vertical grooves 102 are fitted with respect to the vertical members 96 or horizontal members 97, thereby positioning the rubber bodies 93 at the outer peripheries and the center thereof. At each rubber body, its vertical bore coincides with the through-bore 101 and the horizontal groove 103 is internally exposed. Next, the cover 94 is set to cover the front surface and upper surface of shoe body 92 by engaging the engaging members 105 with the retaining bores 99 against the elasticity of rubber, at which time the vertical members 106 engage from above with the horizontal grooves 103 and also fitting portions 107 pass through the horizontal bores 104 and then are fitted into the through bores 100, thereby locking the rubber bodies 93 to be rigidly fixed to the shoe body 92.

Although several embodiments have been described, they are merely exemplary of the invention and not to be construed as limiting, the invention being defined solely by the appended claims.

What is claimed is:

1. A transfer apparatus having a pair of right and left-side endless rotary members disposed along a main transportation route, a plurality of guide bars mounted through free ends thereof between said endless rotary members and extending perpendicularly to said main transportation route, movable members guided by said guide bars, guided portions provided at the rear surface of said movable members respectively, a group of guide members for guiding said guided portions, changeover devices disposed at branches of said group of guide members, and a body frame, said changeover devices each comprising a pair of right and left side swinging members mounted through first support shafts, guided portions formed at the opposite surfaces of said swinging members and at the upstream side of said first support shafts, an operating member laterally swingably mounted through a second support shaft positioned at the upstream side between said first support shafts, a pair of retaining members provided at said operating member and opposite to said guided portions, and an operating device in association with said operating member.

2. A transfer apparatus as set forth in claim 1, wherein said body frame has at both sides a pair of upper and lower frame members, said frame members each being an extrusion mold of aluminum and being provided with a pair of upward dovetail grooves and downward dovetail grooves formed outside and inside respectively.

3. A transfer apparatus as set forth in claim 2, wherein said upper frame members at both sides of said body frame each are formed in an L-like shape by extrusion mold of aluminum, at the upper end of a vertical member positioned inside of each frame member are formed mounting portions for a guide rail for supporting said endless rotary member, and an initial end of a branch conveyer is positioned in proximity to the outside of said vertical member.

4. A transfer apparatus as set forth in claim 3, wherein at the upper portions of both sides of said body frame are disposed guide rails for supportingly guiding said endless rotary members, said guide rails each having at the outer end a side cover portion positioned outside said endless rotary member, and having at the inner end a horizontal guide portion against which a free end of each of said guide bars freely abuts before said endless rotary member abuts against said cover portion.

5. A transfer apparatus as set forth in claim 3, wherein said guide rails each have an upward guide surface for supportingly guiding a chain and a side cover portion positioned outside said chain, said rollers each have at a free end thereof an end cap, at the center of said end cap is formed a fitting bore into which a link pin at said chain is detachably fitted axially of said roller shaft, and at the outer end of said end cap and at a circumferential place thereof is formed a slit communicating with the outer end of said fitting bore and for allowing said link pin to vertically move.

6. A transfer apparatus as set forth in claim 3, wherein the upper portions at both sides of said body frame each have at the upper end an elastic holding portion to form a retaining groove, a cover member freely mountable to said body frame is provided above said endless rotary member, and at the outside end of said cover member is formed a retained portion engageable or disengageable with or from said retaining groove against elasticity of said elastically holding portion.

7. A transfer apparatus as set forth in claim 1, wherein said movable member comprises a shoe body supportingly guided between said adjacent guide bars and having said guided portion, a rubber body capable of being detachably fitted from the lateral side with respect to said shoe body, and a cover body detachably mountable from above to said shoe body and having a fitting portion fitting from above with respect to said rubber body.

* * * * *